(12) United States Patent
Fukasawa et al.

(10) Patent No.: US 10,715,700 B2
(45) Date of Patent: Jul. 14, 2020

(54) PROFILE ADJUSTMENT METHOD, PROFILE ADJUSTMENT APPARATUS, AND PROFILE ADJUSTMENT SYSTEM

(71) Applicant: SEIKO EPSON CORPORATION, Tokyo (JP)

(72) Inventors: Kenji Fukasawa, Nagano (JP); Katsuyuki Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/207,237

(22) Filed: Dec. 3, 2018

(65) Prior Publication Data

US 2019/0174024 A1 Jun. 6, 2019

(30) Foreign Application Priority Data

Dec. 5, 2017 (JP) .................................. 2017-233694

(51) Int. Cl.
*H04N 1/60* (2006.01)
*G06K 15/02* (2006.01)

(52) U.S. Cl.
CPC ....... *H04N 1/6019* (2013.01); *G06K 15/1878* (2013.01); *H04N 1/603* (2013.01); *H04N 1/6008* (2013.01)

(58) Field of Classification Search
CPC . H04N 1/6019; H04N 1/6008; G06K 15/1878
USPC ...................................... 358/523, 1.13, 518
See application file for complete search history.

(56) References Cited

U.S. PATENT DOCUMENTS

| | | | |
|---|---|---|---|
| 2003/0053097 | A1 | 3/2003 | Ohga et al. |
| 2006/0110031 | A1* | 5/2006 | Bala ........................ H04N 1/603 382/162 |
| 2008/0158579 | A1 | 7/2008 | Ohga et al. |
| 2008/0239402 | A1* | 10/2008 | Suzuki ................. H04N 1/6025 358/3.23 |
| 2010/0328691 | A1 | 12/2010 | Hoshino et al. |
| 2019/0132488 | A1 | 5/2019 | Yamashita et al. |
| 2019/0139511 | A1 | 5/2019 | Yamashita |
| 2019/0301941 | A1* | 10/2019 | Kawabata ................. G01J 3/52 |

FOREIGN PATENT DOCUMENTS

| | | |
|---|---|---|
| JP | 10-126628 A | 5/1998 |
| JP | 2003-046796 A | 2/2003 |
| JP | 2003-087589 A | 3/2003 |
| JP | 2011-010231 A | 1/2011 |

(Continued)

*Primary Examiner* — Jamares Q Washington
(74) *Attorney, Agent, or Firm* — Global IP Counselors, LLP

(57) ABSTRACT

A profile adjustment method for causing a computer to execute a process of adjusting a to-be-adjusted profile by using a color conversion module performing a color conversion process of converting coordinate values in a color space with reference to a profile, the profile adjustment method including: setting a color conversion module included in one or more of the color conversion module, as a target module that is a color conversion module to be used; causing the target module to execute the color conversion process of converting input coordinate values in an input color space into output coordinate values in an output color space; and executing a process of using a conversion result by the target module to adjust the to-be-adjusted profile.

15 Claims, 25 Drawing Sheets

(56) References Cited

FOREIGN PATENT DOCUMENTS

| | | |
|---|---|---|
| JP | 2018-207328 A | 12/2018 |
| JP | 2018-207329 A | 12/2018 |
| JP | 2019-009555 A | 1/2019 |
| JP | 2019-009556 A | 1/2019 |
| JP | 2019-068156 A | 4/2019 |
| JP | 2019-087777 A | 6/2019 |
| JP | 2019-087834 A | 6/2019 |

* cited by examiner

SPECIFICATION INFORMATION 770

| RIP NAME | INTERPOLATION METHOD | CONVERSION PATH | NUMBER OF GRID POINTS IN DLT (AXIS DIRECTION) |
|---|---|---|---|
| COMPANY A RIP | 8-POINT INTERPOLATION | DIRECT CONVERSION | 17 GRID POINTS |
| COMPANY B RIP | 4-POINT INTERPOLATION | SEQUENTIAL CONVERSION | 33 GRID POINTS |
| COMPANY C RIP | 5-POINT INTERPOLATION | DIRECT CONVERSION | 17 GRID POINTS |
| COMPANY D RIP | UNKNOWN | UNKNOWN | UNKNOWN |

DLT ...DEVICE LINK TABLE

Fig. 6

| |
|---|
| (a-1) USE SINGLE PROFILE: INPUT PROFILE IS TO BE ADJUSTED<br><br>CurrentOut = $f_{icc}$(InputProfile, A2B, Input) |
| (a-2) USE SINGLE PROFILE: OUTPUT PROFILE IS TO BE ADJUSTED<br><br>CurrentOut = $f_{icc}$(OutputProfile, B2A, Input) |
| (a-3) USE SINGLE PROFILE: DEVICE LINK PROFILE IS TO BE ADJUSTED<br><br>CurrentOut = $f_{icc}$(DLProfile, A2B0, Input) |
| (b-1) USE COMBINATION OF PROFILES: INPUT PROFILE IS TO BE ADJUSTED<br><br>CurrentOut = $f_{icc}$(OutputProfile, B2A, $f_{icc}$(InputProfile, A2B, Input)) |
| (b-2) USE COMBINATION OF PROFILES: OUTPUT PROFILE IS TO BE ADJUSTED<br><br>CurrentOut = $f_{icc}$(OutputProfile, B2A, $f_{icc}$(InputProfile, A2B, Input)) |

WHERE
InputProfile REPRESENTS INPUT PROFILE,
OutputProfile REPRESENTS OUTPUT PROFILE,
DLProfile REPRESENTS DEVICE LINK PROFILE,
ficc REPRESENTS COLOR CONVERSION BASED ON ICC PROFILE,
FIRST ARGUMENT REPRESENTS PROFILE NAME,
A2B IN SECOND ARGUMENT REPRESENTS CONVERSION FROM DEVICE COLOR INTO DEVICE INDEPENDENT COLOR
B2A IN SECOND ARGUMENT REPRESENTS CONVERSION FROM DEVICE INDEPENDENT COLOR INTO DEVICE COLOR
A2B0 IN SECOND ARGUMENT REPRESENTS CONVERSION BASED ON DEVICE LINK TABLE
SECOND ARGUMENT REPRESENTS INPUT VALUES (CMYK, RGB, Lab, OR THE LIKE) FOR ADJUSTMENT POINT

Fig. 17

Fig. 19A (b-1) COMBINE INPUT PROFILE WITH OUTPUT PROFILE
TO SPECIFY RESULTANT PROFILE AS INPUT PROFILE
(b-1-1) SELECT INPUT COLOR SPACE AS TO-BE-ADJUSTED COLOR SPACE

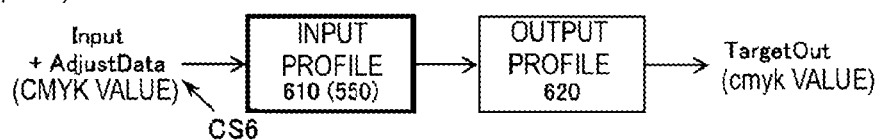

Fig. 19B (b-1) COMBINE INPUT PROFILE WITH OUTPUT PROFILE TO
SPECIFY RESULTANT PROFILE AS INPUT PROFILE
(b-1-2) SELECT OUTPUT COLOR SPACE AS TO-BE-ADJUSTED COLOR SPACE

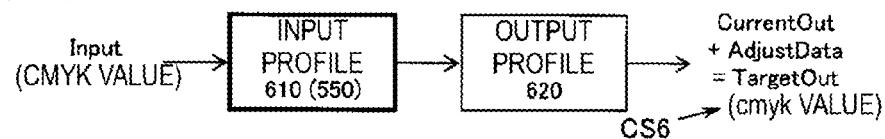

Fig. 19C (b-1) SPECIFY COMBINATION OF INPUT PROFILE
WITH OUTPUT PROFILE AS INPUT PROFILE
(b-1-3) SELECT PCS AS TO-BE-ADJUSTED COLOR SPACE

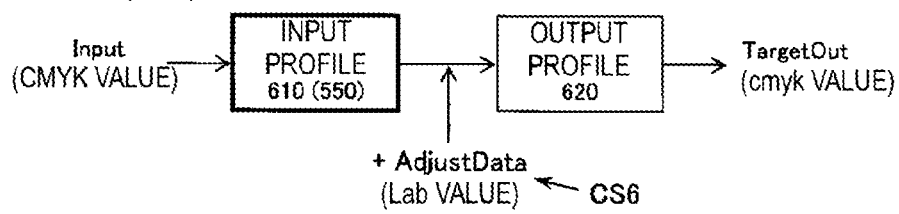

(a-1) USE SINGLE PROFILE: INPUT PROFILE IS TO BE ADJUSTED (a-1-1) SELECT INPUT COLOR SPACE AS TO-BE-ADJUSTED COLOR SPACE
    TargetOut = $f_{icc}$(InputProfile, A2B, Input + AdjustData)
(a-1-2) SELECT OUTPUT COLOR SPACE AS TO-BE-ADJUSTED COLOR SPACE
    TargetOut = $f_{icc}$(InputProfile, A2B, Input) + AdjustData (a-2) USE SINGLE PROFILE: OUTPUT PROFILE IS TO BE ADJUSTED (a-2-1) SELECT INPUT COLOR SPACE AS TO-BE-ADJUSTED COLOR SPACE
    TargetOut = $f_{icc}$(OutputProfile, B2A, Input + AdjustData)
(a-2-2) SELECT OUTPUT COLOR SPACE AS TO-BE-ADJUSTED COLOR SPACE
    TargetOut = $f_{icc}$(OutputProfile, B2A, Input) + AdjustData (a-3) USE SINGLE PROFILE: DEVICE LINK PROFILE IS TO BE ADJUSTED (a-3-1) SELECT INPUT COLOR SPACE AS TO-BE-ADJUSTED COLOR SPACE
    TargetOut = $f_{icc}$(DLProfile, A2B0, Input + AdjustData)
(a-3-2) SELECT OUTPUT COLOR SPACE AS TO-BE-ADJUSTED COLOR SPACE
    TargetOut = $f_{icc}$(DLProfile, A2B0, Input) + AdjustData (b-1) USE COMBINATION OF PROFILES: INPUT PROFILE IS TO BE ADJUSTED (b-1-1) SELECT INPUT COLOR SPACE AS TO-BE-ADJUSTED COLOR SPACE
    TargetOut
    = $f_{icc}$(OutputProfile, B2A, $f_{icc}$(InputProfile, A2B, Input + AdjustData))
(b-1-2) SELECT OUTPUT COLOR SPACE AS TO-BE-ADJUSTED COLOR SPACE
    TargetOut
    = $f_{icc}$(OutputProfile, B2A, $f_{icc}$(InputProfile, A2B, Input)) + AdjustData
(b-1-3) SELECT PCS AS TO-BE-ADJUSTED COLOR SPACE
    TargetOut
    = $f_{icc}$(OutputProfile, B2A, $f_{icc}$(InputProfile, A2B, Input) + AdjustData)

(b-2) USE COMBINATION OF PROFILES: OUTPUT PROFILE IS TO BE ADJUSTED (SAME AS CASE OF (b-1))

Fig. 20

(b-1) SPECIFY COMBINATION OF INPUT PROFILE WITH OUTPUT PROFILE AS INPUT PROFILE (b-2) SPECIFY COMBINATION OF INPUT PROFILE WITH OUTPUT PROFILE AS OUTPUT PROFILE (a-1) USE SINGLE PROFILE: INPUT PROFILE IS TO BE ADJUSTED

Input_P = Input
TargetOut_P = TargetOut (a-2) USE SINGLE PROFILE: OUTPUT PROFILE IS TO BE ADJUSTED (SAME AS CASE OF (a-1))

(a-3) USE SINGLE PROFILE: DEVICE LINK PROFILE IS TO BE ADJUSTED (SAME AS CASE OF (a-1))

(b-1) USE COMBINATION OF PROFILES: INPUT PROFILE IS TO BE ADJUSTED

Input_P = Input
TargetOut_P = $f_{icc}$(OutputProfile, A2B, TargetOut)

(b-2) USE COMBINATION OF PROFILES: OUTPUT PROFILE IS TO BE ADJUSTED

Input_P = $f_{icc}$(InputProfile, A2B, Input)
TargetOut_P = TargetOut

Fig. 22

PROFILE ADJUSTMENT METHOD, PROFILE ADJUSTMENT APPARATUS, AND PROFILE ADJUSTMENT SYSTEM

BACKGROUND

1. Technical Field

The invention relates to a technique for executing a process for adjusting a profile used to convert coordinate values in a color space.

2. Related Art

In a case of using an ink jet-type printer for calibration applications for printing such as offset printing, a demanded color reproduction accuracy (the degree to which colors are accurately reproduced) is very high. One mechanism for achieving such accuracy is a color management system using an International Color Consortium (ICC) profile. The ICC profile is data representing a correspondence relationship between device independent colors and device dependent colors provided by color devices such as a printing machine (for example, an offset printing machine) and an ink jet-type printer. The device dependent colors provided by a printing machine and an ink jet-type printer are represented by coordinate values in a device dependent color space, for example, by CMYK values indicating the use amounts of cyan (C), magenta (M), yellow (Y), and black (K). The device independent colors are represented, for example, by hue values in a Commission Internationale de l'Eclairage (CIE, the International Commission on Illumination) L*a*b* color space (hereinafter "*" is omitted and the L*a*b* value is referred to as the Lab value) or by hue values in a CIE XYZ color space, the color spaces being device independent color spaces.

Here, it is assumed that the ICC profile for a printing machine is used as an input profile, and the ICC profile for an ink jet-type printer is used as an output profile. When CMYK values for the printing machine are converted into hue values (e.g., Lab values) in a Profile Connection Space (PCS) in accordance with the input profile, the hue values can be converted into CMYK values for the ink jet-type printer (hereinafter referred to as $CMYK_p$ values) in accordance with the output profile. Here, a color conversion module that is a program for converting colors with reference to the ICC profile is also referred to as a color management module (CMM). When printing is performed using the ink jet-type printer in accordance with the $CMYK_p$ values, colors similar to the colors provided by the printing machine can be reproduced by the ink jet-type printer. In actuality, expected colors may fail to be reproduced due to an error in the profile, a color measurement error, a fluctuation in the printer, and the like. In such a case, spot color adjustment is performed by specifying an adjustment point representing a spot color to be adjusted, specifying an adjustment target for the adjustment point, and modifying the ICC profile, based on the adjustment target.

JP-A-2003-87589 discloses a method for adjusting input values (Lab values) to an output profile for a CMYK printer to adjust color reproduction in the CMYK printer by using a calibrator as a target device.

The color conversion module that is a program for converting colors with reference to the ICC profile uses different interpolation methods and the like depending on the system and produces varying conversion results even with the same ICC profile. Thus, in a case where a color conversion module used to adjust the profile is different from a color conversion module used for a Raster Image Processor (RIP), output colors may deviate from intended colors even when the adjusted profile is used for the RIP.

The above-described problem occurs not only in the case of adjustment of the profiles intended for ink jet-type printers but also in the case of adjustment of profiles intended for various color devices.

SUMMARY

An advantage of some aspects of the invention is to provide a technique that enables, during the use of adjusted profiles, intended color conversion results to be further obtained.

To achieve the advantage, an aspect of the invention provides a profile adjustment method for causing a computer to execute a process of adjusting a to-be-adjusted profile by using a color conversion module performing a color conversion process of converting coordinate values in a color space with reference to a profile, the profile adjustment method including setting a color conversion module included in one or more of the color conversion module, as a target module that is a color conversion module to be used, causing the target module to execute the color conversion process of converting input coordinate values in an input color space into output coordinate values in an output color space, and executing a process of using a conversion result by the target module to adjust the to-be-adjusted profile.

Furthermore, another aspect of the invention provides a profile adjustment program causing a computer to implement functions corresponding to the steps of the above-described profile adjustment method.

Moreover, yet another aspect of the invention provides a profile adjustment device including units corresponding to the steps of the above-described profile adjustment method.

Moreover, still another aspect of the invention provides a profile adjustment system including units corresponding to the steps of the above-described profile adjustment method.

The above-described aspect of the invention can provide a technique that enables, during the use of adjusted profiles, intended color conversion results to be further obtained.

BRIEF DESCRIPTION OF THE DRAWINGS

The invention will be described with reference to the accompanying drawings, wherein like numbers reference like elements.

FIG. 6 is a diagram schematically illustrating an example of specification information about color conversion modules.

FIG. 17 is a diagram schematically illustrating an example of equations for calculating the current output values.

FIGS. 19A to 19C are diagrams schematically illustrating examples of calculation of target output values according to the to-be-adjusted color space.

FIG. 20 is a diagram schematically illustrating an example of equations for calculating the target output values.

FIG. 22 is a diagram schematically illustrating an example of equations for calculating the input values and the adjustment target values for the to-be-adjusted profile.

DESCRIPTION OF EXEMPLARY EMBODIMENTS

Figure 1:
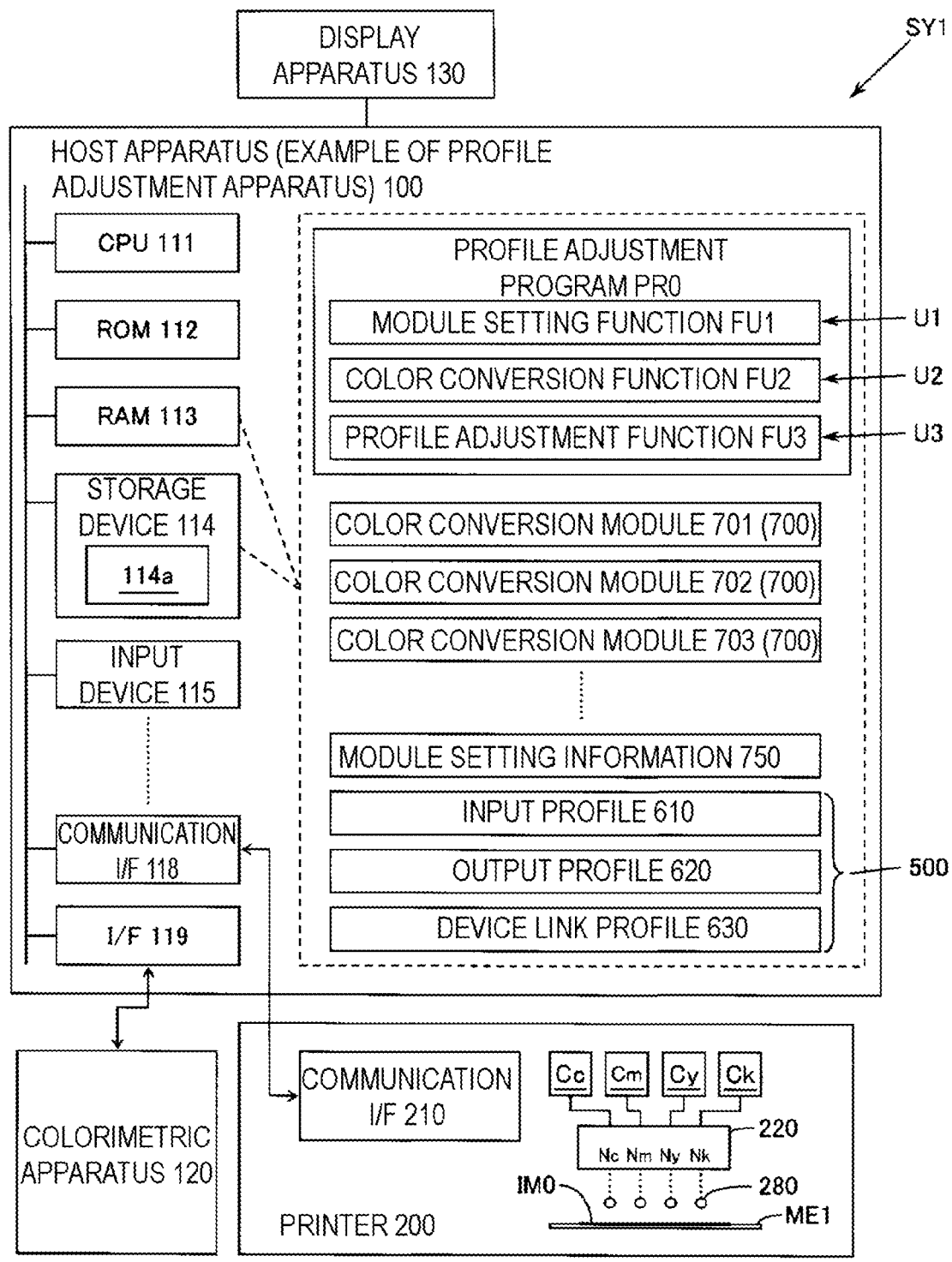
FIG. 1 is a block diagram schematically illustrating a configuration example of a profile adjustment system.

Exemplary embodiments of the invention will be described. Of course, the following exemplary embodiments only illustrate the invention, and not all features illustrated in the exemplary embodiments are indispensable for the solution of the invention.

1. OVERVIEW OF TECHNIQUE INCLUDED IN INVENTION

First, an overview of the technique included in the invention will be described with reference to examples illustrated in FIGS. 1 to 25. Note that the drawings of the present application schematically illustrate the examples, that an enlargement factor in each direction illustrated in each drawing may vary among the drawings, and that the drawings may not be consistent with one another. Of course, the elements of the technique are not limited to specific examples illustrated with reference numerals.

Aspect 1

As illustrated in FIG. 2, FIGS. 5 to 13, and the like, a profile adjustment method according to Aspect 1 of the technique is a profile adjustment method of causing a computer (e.g., a host apparatus 100) to execute a process of adjusting a to-be-adjusted profile 550 by using a color conversion module 700 executing a color conversion process of converting coordinate values in a color space with reference to a profile 500, and includes a module setting step ST1, a color conversion step ST2, and a profile adjustment step ST3. The module setting step ST1 includes setting a color conversion module included in one or more of the color conversion module 700, as a target module 710 that is a color conversion module to be used. The color conversion step ST2 includes causing the target module 710 to execute the color conversion process of converting input coordinate values in an input color space CS4 into output coordinate values in an output color space CS5. The profile adjustment step ST3 includes adjusting the to-be-adjusted profile 550 by using a conversion result produced by the target module 710.

The color conversion module 700 uses different interpolation methods and the like depending on the system and produces varying conversion results even with the same profile 500. Aspect 1 can set the target color conversion module 700 to be compatible with the system, thus allowing, when the profile 500 is adjusted, the intended profile 500 to be obtained. Aspect 1 can therefore provide a profile adjustment method that enables, during the use of adjusted profiles, intended color conversion results to be further obtained.

Here, setting the target module includes accepting a setting for the target module (e.g., accepting, from the user, an operation of determining the target module) and determining one of one or more color conversion modules to be the target module without relying on the operation.

Aspect 2

Figure 5:
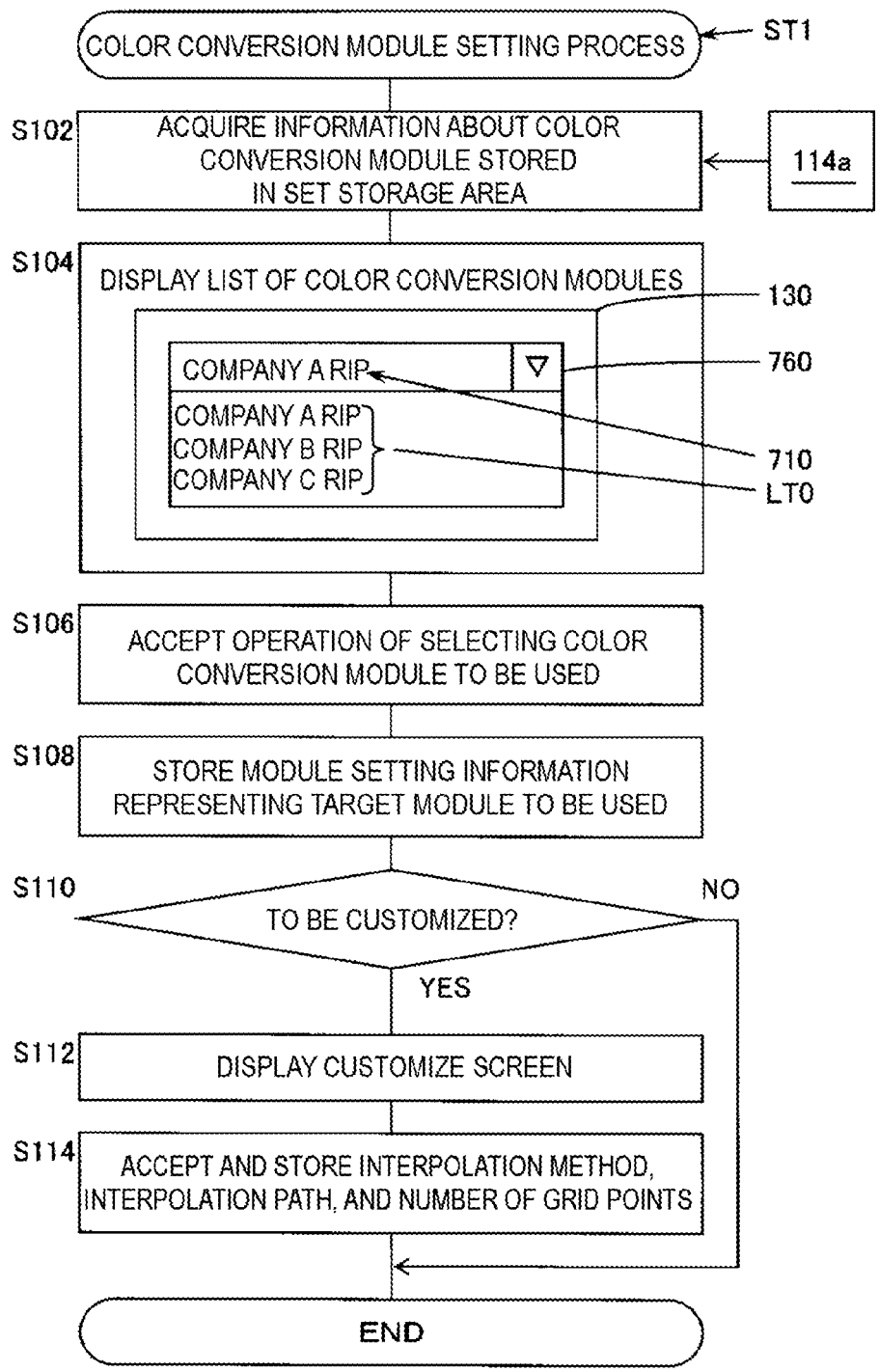
FIG. 5 is a flowchart illustrating an example of a color conversion module setting process.

As illustrated in FIG. 5, the module setting step ST1 may include causing a display apparatus 130 to display a list LT0 of the one or more color conversion modules 700 stored in a storage area 114a. The module setting step ST1 may include accepting an operation of determining the target module 710 by selection from the list LT0. Aspect 2 enables selection of the target module 710 from the list LT0 of the one or more color conversion modules 700 stored in the storage area 114a, allowing improvement of convenience in adjustment of the profile.

Figure 25:
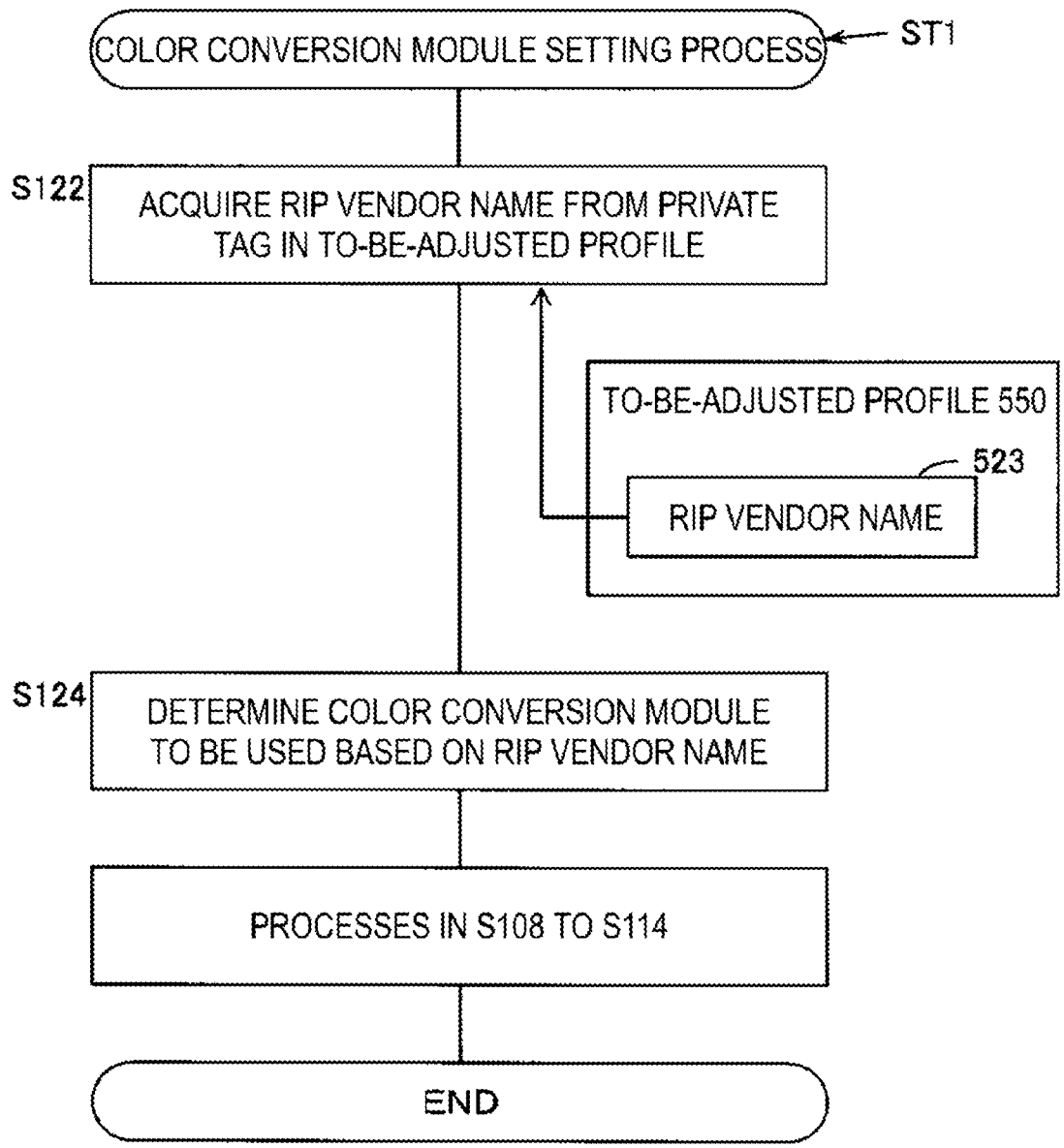
FIG. 25 is a flowchart illustrating another example of the color conversion module setting process.

As illustrated in FIG. 25, the module setting step ST1 may include determining one of the one or more color conversion modules 700 stored in the storage area 114a to be the target module 710, based on the to-be-adjusted profile 550. Aspect 2 automatically determines one of the one or more color conversion modules 700 stored in the storage area 114a to be the target module 710, allowing improvement of convenience in adjustment of the profile.

Aspect 4

As illustrated in FIG. 5, FIGS. 8A to 8D, FIG. 9, and FIG. 11, the module setting step ST1 may include accepting a setting for a target interpolation method 781a that is an interpolation method to be used which is included in possible interpolation methods for obtaining the output coordinate values when the target module 710 executes the color conversion process. The color conversion step ST2 may include determining the output coordinate values corresponding to the input coordinate values in accordance with the target interpolation method 781a. Aspect 4 enables the profile to be adjusted by a color conversion process maximally compatible with the color conversion module even in a case where a color conversion module to be used for a system such as the RIP is unavailable.

Aspect 5

Here, as illustrated in FIGS. 8A to 8D and FIG. 9, the interpolation method may be an n-point interpolation method of interpolating the output coordinate values, based on coordinate values in the output color space CS5 for n (n is an integer of 4 or larger) grid points GD0 in the profile 500. Aspect 5 can provide a suitable example in which the profile is adjusted by a color conversion process maximally compatible with the color conversion module to be used for a system such as the RIP.

Aspect 6

Figure 3:
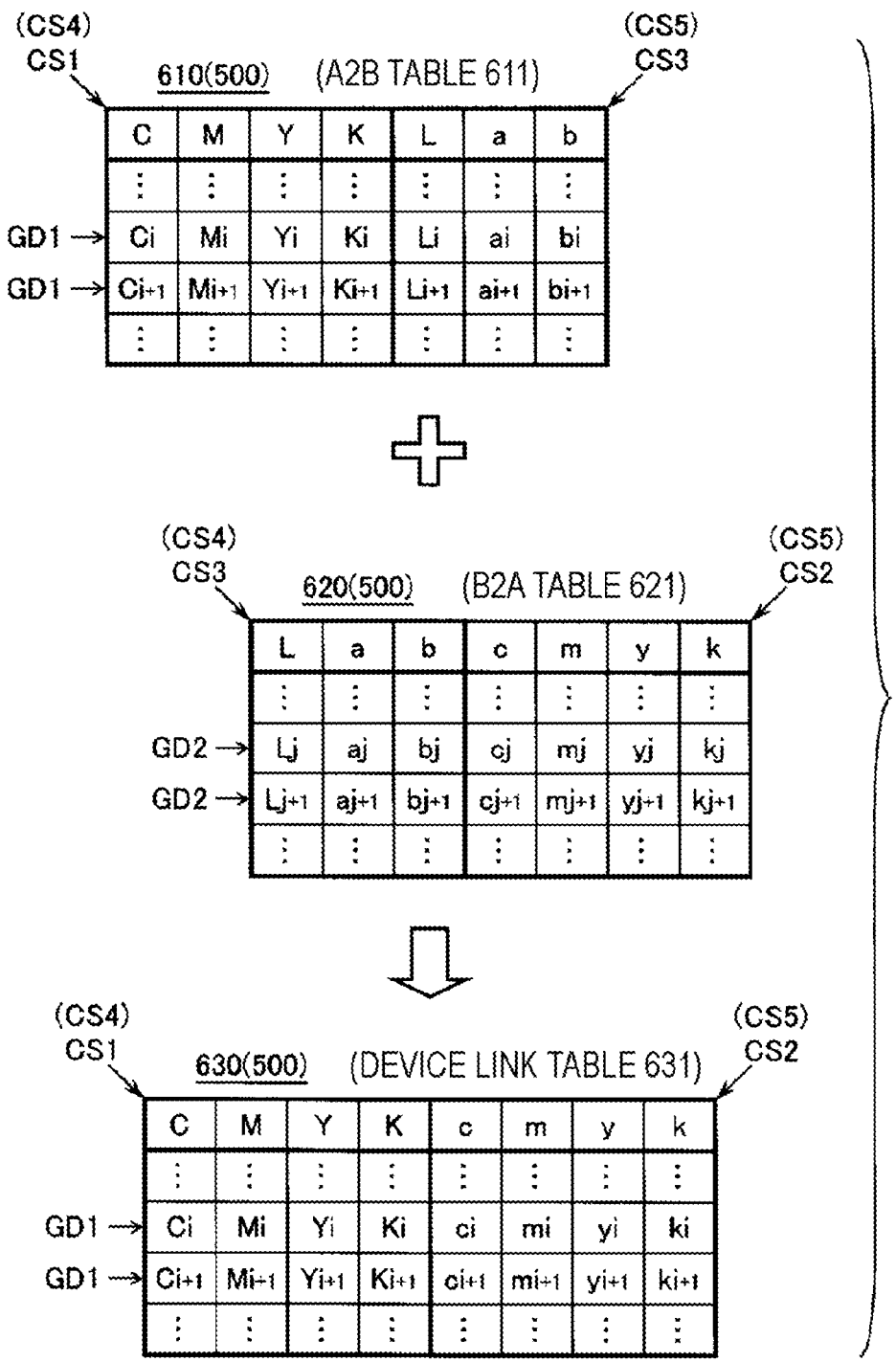
FIG. 3 is a diagram schematically illustrating an example of a relationship between various profiles.
Figure 10:
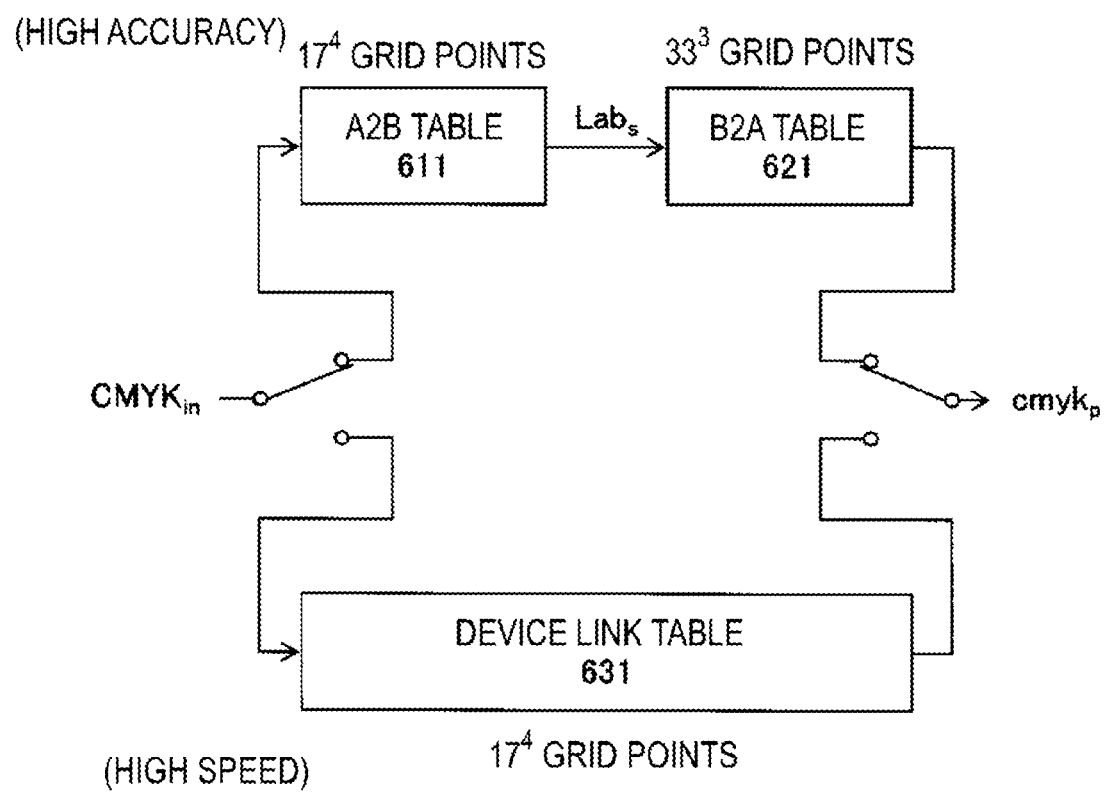
FIG. 10 is a diagram schematically illustrating an example of switching between color conversion paths.
Figure 11:
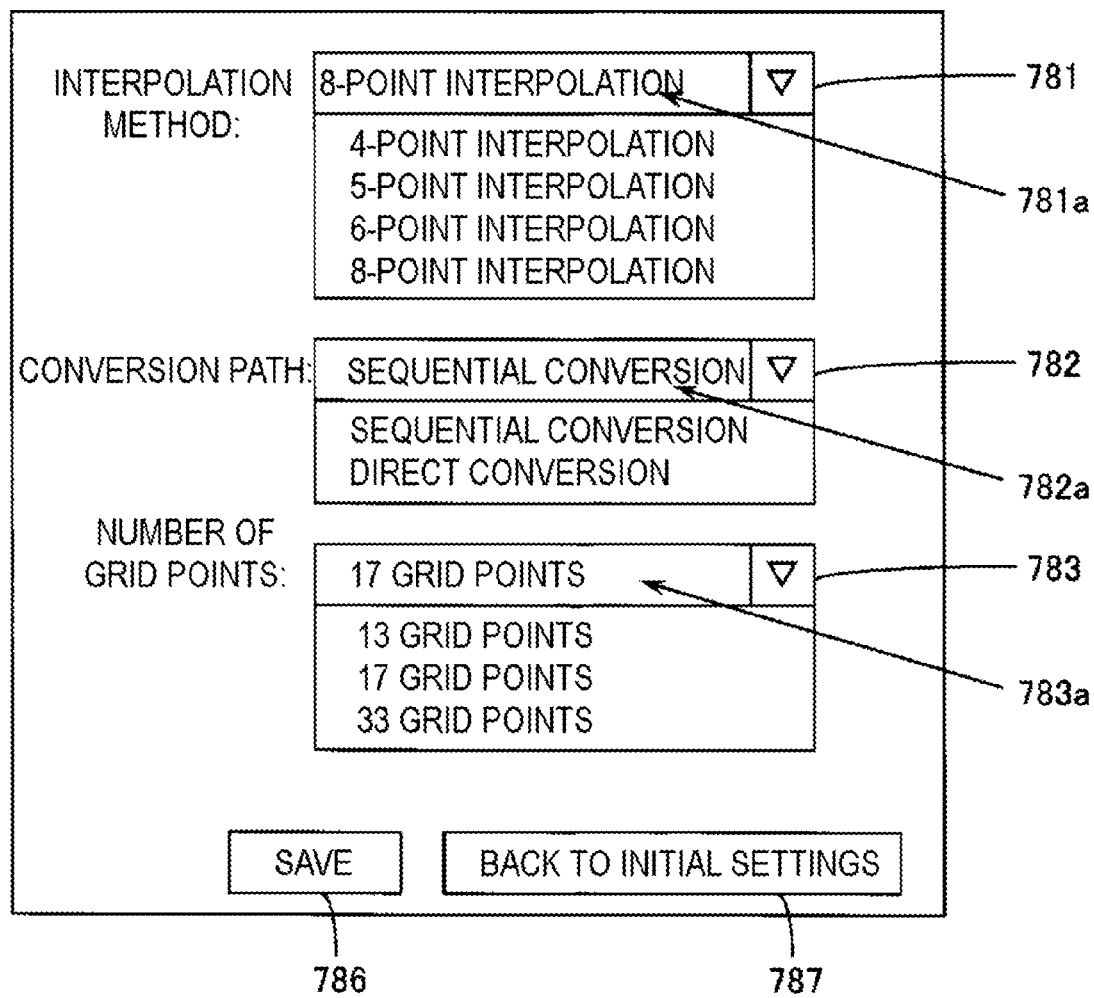
FIG. 11 is a diagram schematically illustrating an example of a customized screen.

As illustrated in FIG. 3 and the like, the profile 500 may include an input profile 610 representing a correspondence relationship between first coordinate values (e.g., CMYK values) in a first device dependent color space CS1 (e.g., a CMYK color space) and device independent coordinate values (e.g., Lab values) in a profile connection space CS3 (e.g., a Lab color space), an output profile 620 representing a correspondence relationship between the device independent coordinate values (Lab values) and second coordinate values (e.g., cmyk values) in a second device dependent color space CS2 (e.g., a cmyk color space), and a device link profile 630 representing a correspondence relationship between the first coordinate values (CMYK values) and the second coordinate values (cmyk values). As illustrated in FIG. 10, FIG. 11, and the like, the module setting step ST1 may include accepting information indicating whether to provide a first conversion setting or a second conversion setting: with the first conversion setting, the profile connection space CS3 (Lab color space) is passed through when the input coordinate values in the first device dependent color space CS1 (CMYK color space) is converted into the output coordinate values in the second device dependent color space CS2 (cmyk color space), and with the second conversion setting, passage of the profile connection space CS3 (Lab color space) is avoided through when the input coordinate values are converted. The color conversion step ST2 may include causing, in a case where the first conversion setting is accepted, the target module 710 to execute the color conversion process of referring to the input profile 610 and the output profile 620 to convert the input coordinate values (CMYK values) in the first device dependent color space CS1 (CMYK color space) into the output coordinate values (cmyk values) in the second device dependent color space CS2 (cmyk color space). The color conversion step ST2 may also include causing, in a case where the second conversion setting is accepted, the target module 710 to execute the color conversion process of referring to the device link profile 630 to convert the input coordinate values (CMYK values) in the first device dependent color space CS1 (CMYK color space) into the output coordinate values (cmyk values) in the second device dependent color space CS2 (cmyk color space).

In the first conversion setting involving passage through the profile connection space CS3 (Lab color space), the color conversion process is executed such that color reproduction characteristics represented by the input profile 610 (color reproduction characteristics of a first device) are accurately reproduced in a second device having color reproduction characteristics represented by the output profile 620. However, this leads to a need to execute both the color conversion process referring to the input profile 610 and the color conversion process referring to the output profile 620, and thus, the entire process correspondingly takes much time.

The second conversion setting avoiding the passage through the profile connection space CS3 (Lab color space) needs only one color conversion process referring to the device link profile 630, into which the input profile 610 and the output profile 620 are combined, correspondingly reducing the time for processing. However, a combination of the plurality of profiles 500 results in a reduced color conversion accuracy.

Aspect 6 enables selection between the first conversion setting prioritizing the color reproduction accuracy and the second conversion setting prioritizing fast processing, allowing convenience to be improved.

Here, examples of the profile connection space include color spaces such as a CIE Lab color space and a CIE XYZ color space.

Examples of the first device dependent color space include a CMYK color space, a CMY color space, and an RGB color space. Note that R means red, G means green, and B means blue.

Examples of the second device dependent color space include a CMYK color space, a CMY color space, and an RGB color space. In the exemplary embodiments described below, to be distinguished from the CMYK color space of the first device dependent color space in a case where the second device dependent color space is the CMYK color space, the second device dependent color space is represented as a cmyk color space.

This additional description also applies to the following aspects.

Aspect 7

As illustrated in FIG. 11 and the like, the module setting step ST1 may include accepting a setting for the number of grid points in the to-be-adjusted profile 550. The profile adjustment step ST3 may include generating the to-be-adjusted profile 550 including a plurality of grid points GD0 corresponding to the number of grid points. An increase in the number of grids in the profile 500 may improve the color reproduction accuracy but correspondingly leads to an increased amount of time for processing and an increased data capacity of the profile 500. Aspect 7 enables selective determination of whether to prioritize the color reproduction accuracy or the fast processing, allowing convenience to be improved.

Aspect 8

A profile adjustment program PRO according to Aspect 8 of the technique causes a computer (e.g., the host apparatus 100) to implement a module setting function FU1 corresponding to the module setting step ST1, a color conversion function FU2 corresponding to the color conversion step ST2, and a profile adjustment function FU3 corresponding to the profile adjustment step ST3. Aspect 8 can provide a profile adjustment program improving the color reproduction accuracy of the profile representing the correspondence relationship between the coordinate values in the device dependent color space and the coordinate values in the profile connection space CS3.

Aspect 9

Furthermore, a profile adjustment apparatus (e.g., the host apparatus 100) according to Aspect 9 of the technique includes a module setting unit U1 corresponding to the module setting step ST1, a color conversion unit U2 corresponding to the color conversion step ST2, and a profile adjustment unit U3 corresponding to the profile adjustment step ST3. Aspect 9 can provide a profile adjustment apparatus improving the color reproduction accuracy of the profile representing the correspondence relationship between the coordinate values in the device dependent color space and the coordinate values in the profile connection space.

Aspect 10

Moreover, a profile adjustment system SY1 according to Aspect 10 of the technique includes a printing apparatus (for example, a printer 200) for printing a color chart including patches, a colorimetric apparatus 120 executing a colorimetric process on the patches, and the units of Aspect 8. Aspect 10 can provide a profile adjustment system improving the color reproduction accuracy of the profile representing the correspondence relationship between the coordinate values in the device dependent color space and the coordinate values in the profile connection space.

Moreover, the technique is applicable to, e.g., a control method for a profile adjustment apparatus, a composite system including the profile adjustment apparatus, a control method for the composite system, a control program for the profile adjustment apparatus, a control program for the composite system, a computer readable medium in which a profile adjustment program and the control programs are recorded. The above-described apparatus may include a plurality of separate units.

2. SPECIFIC EXAMPLE OF CONFIGURATION OF PROFILE ADJUSTMENT SYSTEM

FIG. 1 schematically illustrates a configuration example of a profile adjustment system including a profile adjustment apparatus. The profile adjustment system SY1 illustrated in FIG. 1 includes the host apparatus 100 (an example of the profile adjustment apparatus), the display apparatus 130, the colorimetric apparatus 120, and the ink jet-type printer 200. In the host apparatus 100, a Central Processing Unit (CPU) 111, a Read Only Memory (ROM) 112, a Random Access Memory (RAM) 113, a storage device 114, an input device 115, a communication interface (I/F) 118, a colorimetric apparatus I/F 119, and the like are connected to one another such that these components can output and receive information to and from one another. The ROM 112, the RAM 113, and the storage device 114 are memories, and at least the ROM 112 and the RAM 113 are semiconductor memories. The display apparatus 130 displays a screen corresponding to display data from the host apparatus 100, based on the display data. A liquid crystal display panel or the like may be used for the display apparatus 130.

The storage device 114 stores, e.g., an operating system (OS) not illustrated in the drawings, a profile adjustment program PRO, and color conversion modules 701, 702, 703, . . . , executing a color conversion process of converting coordinate values in a color space with reference to the profile 500. The OS, the profile adjustment program PRO, the color conversion modules 701, 702, 703, . . . , and the like are read into the RAM 113 when appropriate, and used for an adjustment process for the profile 500. Here, the profile 500 is a generic term for an input profile 610, an output profile 620, and a device link profile 630. Furthermore, the color conversion modules 701, 702, 703, . . . , are collectively referred to as the color conversion modules 700. Each of the color conversion modules 700 is a program that at least receives, as arguments, information representing a profile to be used and input coordinate values in an input color space CS4 (see, e.g., FIG. 3) for the profile and that returns output coordinate values (conversion result) in an output color space CS5 for the profile. The color conversion module 800 in this specific example is assumed to be stored in a storage area 114a set in the storage device 114. Of course, the storage area for the color conversion module 700 may be provided, other than in the storage device 114, in a portable recording medium from which the host apparatus 100 can read data, a storage device of a server computer connected to the host apparatus 100 through a network such as the Internet, or the like. At least one of the RAM 113 and the storage device 114 stores various pieces of information, for example, module setting information 750, the input profile 610, the output profile 620, the device link profile 630, and an adjustment history not illustrated in the drawings. The module setting information 750 includes information indicating which of the color conversion modules 701, 702, 703, . . . , is used for the color conversion process. The storage device 114 may be a nonvolatile semiconductor memory such as a flash memory, a magnetic storage device such as a hard disk, or the like.

The input device 115 may be a pointing device, a hard key including a keyboard, a touch panel attached to a surface of a display panel, or the like. The communication I/F 118 is connected to a communication I/F 210 in the printer 200 to output and receive information such as print data to and from the printer 200. The colorimetric apparatus I/F 119 is connected to the colorimetric apparatus 120 to acquire colorimetric data including colorimetric values, from the colorimetric apparatus 120. Standards to which the I/Fs 118, 119, and 210 conform to may include Universal Serial Bus (USB) and near-field communication. Communication through the communication I/Fs 118, 119, and 210 may be wired or wireless and may be network communication such as through a Local Area Network (LAN) or the Internet.

The colorimetric apparatus 120 is capable of executing a colorimetric process on each color patch formed on a print substrate that is an example of a medium on which a color chart is formed, to output a colorimetric value. The patch is also referred to as a color chip. The colorimetric value is defined as a value representing, e.g., a lightness L and chromaticity coordinates a and b in a CIE Lab color space. The host apparatus 100 acquires colorimetric data from the colorimetric apparatus 120 to execute various processes.

The profile adjustment program PRO illustrated in FIG. 1 causes the host apparatus 100 to implement the module setting function FU1, the color conversion function FU2, and the profile adjustment function FU3.

The CPU 111 of the host apparatus 100 reads, into the RAM 113, the information stored in the storage device 114 when appropriate and executes the read program to perform various processes. The CPU 111 executes the profile adjustment program PRO read into the RAM 113 to perform processes corresponding to the above-described functions FU1 to FU3. The profile adjustment program PRO causes the host apparatus 100, which is a computer, to function as a module setting unit U1, a color conversion unit U2, and a profile adjustment unit U3. The host apparatus 100, which executes the profile adjustment program PRO, implements the module setting step ST1, the color conversion step ST2, and the profile adjustment step ST3. The computer readable medium, which stores the profile adjustment program PRO causing the computer to implement the above-described functions FU1 to FU3, is not limited to the storage device inside the host apparatus but may be a recording medium outside the host apparatus.

Note that examples of the host apparatus 100 include computers such as personal computers (including tablet terminals). For example, in a case where a main body of a desktop personal computer is applied to the host apparatus 100, the display apparatus 130, the colorimetric apparatus 120, and the printer 200 are typically connected to the main body. In a case where a computer such as a display apparatus-integrated laptop personal computer is applied to the host apparatus 100, the colorimetric apparatus 120 and the printer 200 are typically connected to the computer. The display apparatus-integrated host apparatus similarly outputs display data to the internal display apparatus. Furthermore, the host apparatus 100 may include all the components 111 to 119 in one housing but may include a plurality of devices separated from one another in such a manner that allows the devices to communicate with one another. Moreover, the technique can be implemented even in a case where at least a part of the display apparatus 130, the colorimetric apparatus 120, and the printer 200 is included in the host apparatus 100.

The printer 200 (an example of an output device) illustrated in FIG. 1 is assumed to be an ink jet-type printer that discharges (injects) a cyan (C) ink, a magenta (M) ink, a yellow (Y) ink, and a black (K) ink from a recording head 220 as color materials to form an output image IMO corresponding to print data. The recording head 220 is fed with the cyan, magenta, yellow, and black (CMYK) inks from ink cartridges Cc, Cm, Cy, and Ck, respectively, to discharge CMYK ink droplets 280 through respective nozzles Nc, Nm, Ny, and Nk. When the ink droplets 280 land on a print substrate ME1, ink dots are formed on the print substrate ME1. As a result, printed matter is provided including an output image IMO on the print substrate ME1.

3. SPECIFIC EXAMPLE OF COLOR MANAGEMENT SYSTEM

Now, with reference to FIG. 2, an example of a color management system to which the technique is applicable will be described.

Figure 2:
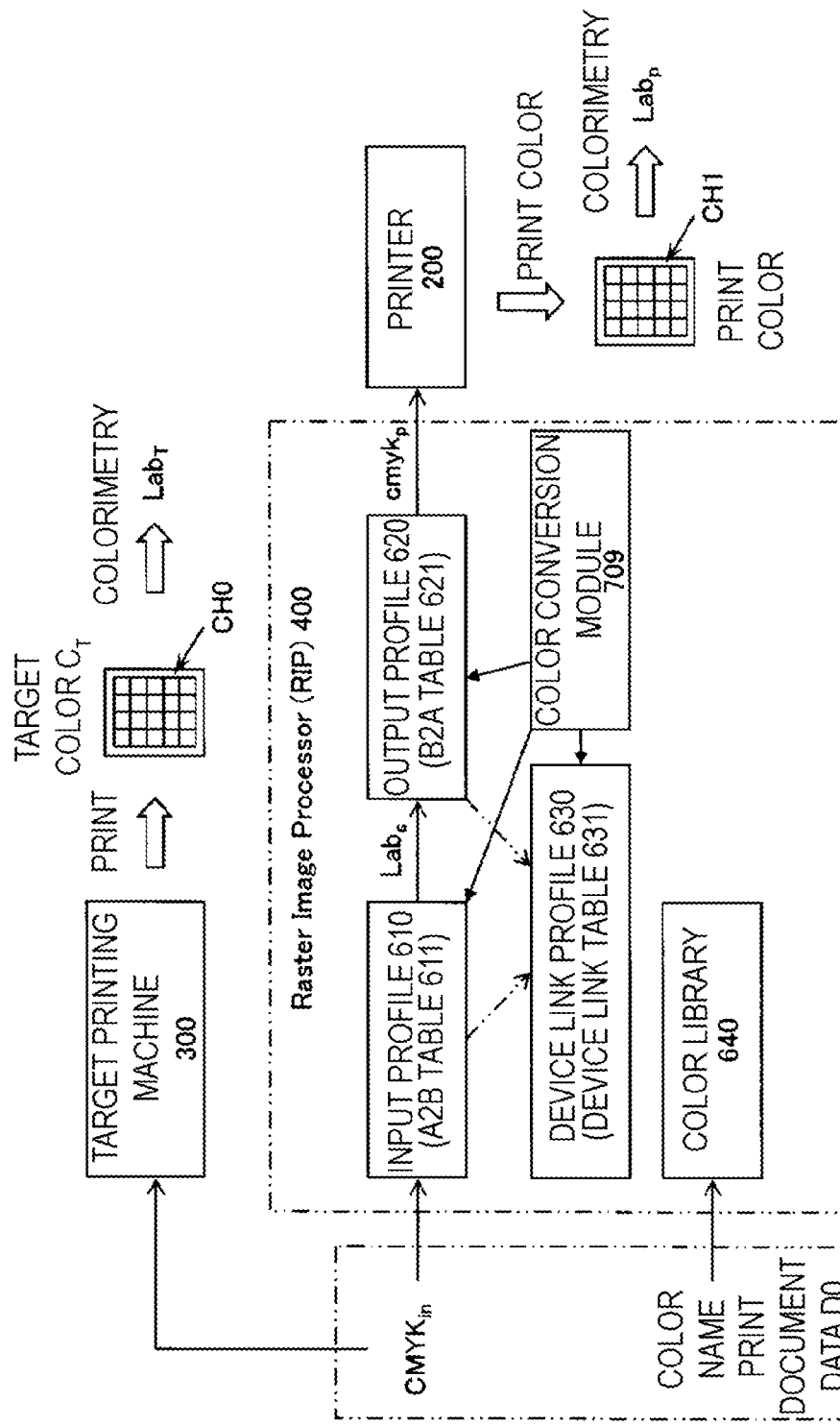
FIG. 2 is a diagram schematically illustrating an example of a color management flow.

The color management system illustrated in FIG. 2, for example, causes a Raster Image Processor (RIP) 400 implemented in the host apparatus 100 to convert print document data DO into output data representing print colors $cmyk_p$ (cyan, magenta, yellow, and black), and causes the ink jet-type printer 200 to form printed matter. The RIP 400 varies according to different vendors and includes a specific color conversion module 709. The print document data DO represents process colors $CMYK_{in}$ allowing a target color ($C_T$) to be reproduced using CMYK inks (color materials) in a target printing machine 300, an example of a target apparatus for color matching. Color names in a color library may be specified for the print document data DO. The color library may be, e.g., a Pantone (registered trademark) color library.

The target printing machine 300 is assumed to be an offset printing machine but may be a photogravure press, a flexographic press, or the like. The target color $C_T$ is represented, for example, by a coordinate value (Lab value) in the CIE Lab color space. FIG. 2 illustrates how the target printing machine 300 prints, on the print substrate, a color chart CH0 representing the target color $C_T$ and how the colorimetric apparatus executes a colorimetric process on each patch of the color chart CH0 to acquire a colorimetric value $Lab_T$. The process colors $CMYK_{in}$ correspond to the use amounts of the CMYK inks used in the target printing machine 300, and represent coordinates in the CMYK color space depending on the target printing machine 300.

The RIP 400 illustrated in FIG. 2 includes the input profile 610, the output profile 620, the device link profile 630, and a color library 640. The input profile 610 is a file describing color properties of inks used in the target printing machine 300. The output profile 620 is a file describing color properties of inks used in the ink jet-type printer 200. The device link profile 630 is a combination of the input profile 610 with the output profile 620. For the profiles 610, 620, and 630, for example, a data format of an ICC profile may be used. The process colors $CMYK_{in}$ in the print document data DO are converted into print colors $cmyk_p$ by using one of a first conversion path involving passage through the colors $Lab_s$ in the Lab color space and a second conversion path avoiding the passage through the colors $Lab_s$ in the Lab color space. On the first conversion path, the process colors $CMYK_{in}$ are converted into colors $Lab_s$ in the Lab color space in accordance with an A2B table 611 of the input profile 610, and the colors $Lab_s$ are converted into print colors $cmyk_p$ in accordance with a B2A table 621 of the output profile 620. On the second conversion path, the process colors $CMYK_{in}$ are converted into print colors $cmyk_p$ in accordance with a device link table 631 of the device link profile 630.

In a case where the printer 200 uses a total of four inks, i.e., the CMYK inks, the print colors $cmyk_p$ are output to the printer 200, which reproduces the print colors $cmyk_p$ on the printed matter. FIG. 2 illustrates how the printer 200 prints a color chart CH1 representing the print colors $cmyk_p$ on the print substrate and how the colorimetric apparatus 120 executes a colorimetric process on each patch of the color chart CH1 to acquire colorimetric values $Lab_p$. In a case where the printer 200 also uses inks such as light cyan (Lc), light magenta (Lm), dark yellow (DY), and light black (Lk), when the RIP 400 or the printer 200 classifies the print colors $cmyk_p$ into deep colors and light colors, the printer 200 can reproduce the print colors $cmyk_p$ on the printed matter. Of course, the print colors are not limited to a total of four colors, i.e., CMYK.

Furthermore, in a case where color names are set for the print document data DO, the RIP 400 may refer to the color library 640 to convert the color names into colors Labs in the Lab color space.

Note that the RIP 400 also includes an input profile for a conversion between coordinate values in the Lab color space and process colors other than the process colors $CMYK_{in}$, e.g., process colors (denoted as $CMY_{in}$) representing the use amounts of color materials of only three primary colors CMY corresponding to subtractive color mixture or process colors (denoted as $RGB_{in}$) representing the intensities of three primary colors of red (R), green (G), and blue (B) corresponding to additive color mixture. Therefore, the RIP 400 can convert the process colors $CMY_{in}$, the process colors $RGB_{in}$, or the like into print colors $cmyk_p$ via the Lab color space. In addition, the RIP 400 can receive the colors $Lab_s$ in the Lab color space to convert the colors into print colors $cmyk_p$.

As described above, the ink jet-type printer 200 can reproduce colors similar to colors reproduced by the target printing machine 300. However, in actuality, expected colors may fail to be reproduced due to an error in the profile, a color measurement error, a fluctuation in the printer, and the like. In such a case, modifications to the profiles 610 and 620 increase a conversion accuracy of the target color.

4. SPECIFIC EXAMPLE OF PROFILE

FIG. 3 schematically illustrates a relationship among the input profile 610, the output profile 620, and the device link profile 630.

As illustrated in FIG. 3, the input profile 610 is data specifying a correspondence relationship between CMYK values ($C_i$, $M_i$, $Y_i$, $K_i$) in the CMYK color space (an example of the first device dependent color space CS1) corresponding to the inks used in the target printing machine 300 and Lab values ($L_i$, $a_i$, $b_i$) in the Lab color space (an example of the profile connection space (PCS) CS3). In this case, grid points GD1 in the A2B table 611 are typically arranged in the CMYK color space at substantially equal intervals in a C axis direction, an M axis direction, a Y axis direction, and a K axis direction. Here, the variable i is a variable identifying each grid point GD1 set in the CMYK color space (CS1). The CMYK values are an example of first coordinate values. The Lab values are an example of device independent coordinate values. In a case where only the input profile 610 is used, the CMYK color space (CS1) is an example of an input color space CS4, and the Lab color space (CS3) is an example of an output color space CS5.

Note that the first device dependent color space is also referred to as a first color space.

The output profile 620 is data specifying a correspondence relationship between Lab values ($L_j$, $a_j$, $b_j$) in the Lab color space (CS3) and cmyk values ($c_j$, $m_j$, $y_j$, $k_j$) in the cmyk color space (an example of the second device dependent color space CS2) corresponding to the inks used in the ink jet-type printer 200. In this case, grid points GD2 in the B2A table 621 are typically arranged in the Lab color space at substantially equal intervals in an L axis direction, an axis direction and a b axis direction. Here, the variable j is a variable identifying each grid point GD2 set in the Lab color space (CS3). The expression "cmyk color space" is used to distinguish the color space corresponding to the inks used in the printer 200 from the color space corresponding to the inks used in the target printing machine 300. The cmyk values are an example of second coordinate values. In a case where only the output profile 620 is used, the Lab color space (CS3) is an example of the input color space CS4, and the cmyk color space (CS2) is an example of the output color space CS5. A color reproduction region of the output color (cmyk$_p$) represented by the cmyk values depends on the printer 200. Therefore, even when Lab values ($L_j$, $a_j$, $b_j$) in the B2A table 621 represent a point outside the color reproduction region, cmyk values ($c_j$, $m_j$, $y_j$, $k_j$) resulting from mapping to a color reproduction region of the printer 200 are associated with the Lab value ($L_j$, $a_j$, $b_j$).

Note that the second device dependent color space is also referred to as a second color space.

The device link profile 630 is data specifying a correspondence relationship between CMYK values ($C_i$, $M_i$, $Y_i$, $K_i$) in the CMYK color space (CS1) and cmyk values ($c_i$, $m_i$, $y_i$, $k_i$) in the cmyk color space (CS2). In this case, each grid point GD1 in a device link table 631 is a corresponding grid point in the A2B table 611 of the input profile 610. Here, the variable i is a variable identifying each grid point GD1 set in the CMYK color space (CS1). Of course, each grid point GD1 in the device link table 631 may differ from a grid point in the A2B table 611 of the input profile 610. The device link profile 630 is acquired by merging the input profile 610 (particularly the A2B table 611) and the output profile 620 (particularly the B2A table 621). In the device link profile 630, the CMYK color space (CS1) is an example of the input color space CS4, and the cmyk color space (CS2) is an example of the output color space CS5.

Note that the conversion table included in each of the profiles 610, 620, and 630 is not limited to a single conversion table but may be a combination of a plurality of conversion tables such as a combination of a one-dimensional conversion table, a three- or four-dimensional conversion table, and a one-dimensional table. Hence, the conversion tables illustrated in FIG. 3 may directly illustrate three- or four-dimensional conversion tables included in the profiles 610, 620, and 630 or illustrate a combination of a plurality of conversion tables included in the profiles 610, 620, and 630.

Furthermore, the grid points mean virtual points arranged in the input color space, and the output coordinate values corresponding to the position of each grid point in the input color space is assumed to be stored at the grid point. The technique includes not only even arrangement of a plurality of grid points in the input color space but also uneven arrangement of a plurality of grid points in the input color space.

Figure 4:
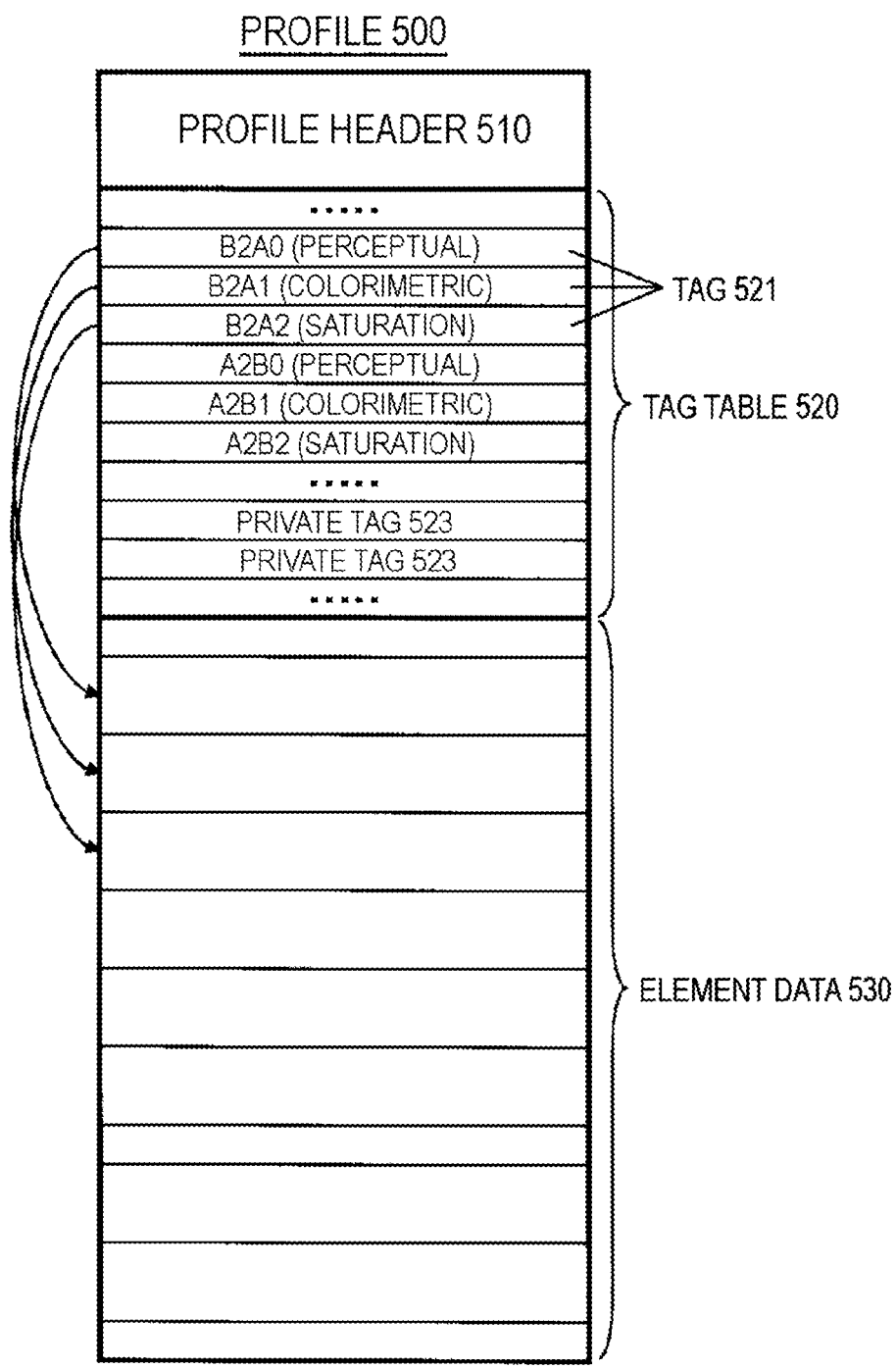
FIG. 4 is a diagram schematically illustrating a structure example of a profile.

FIG. 4 schematically illustrates the structure of the profile 500, particularly the input profile 610 and the output profile 620. The profile 500 illustrated in FIG. 4 is an ICC profile and includes a profile header 510 and a tag table 520. The profile 500 includes tags 521 that are information used to convert color information between the PCS and the device dependent color space. The tags 521 may include private tags 523 used to customize the profile 500.

A2Bx tags for the devices (300 and 200) (x illustrated in FIG. 4 is 0, 1, or 2) include, as element data 530, a color conversion table used to convert the device dependent color space (CMYK color space or cmyk color space) into the Lab color space. B2Ax tags for the devices (300 and 200) include, as the element data 530, a color conversion table used to convert the Lab color space into the device dependent color space (CMYK color space or cmyk color space).

An A2B0 tag and a B2A0 tag illustrated in FIG. 4 are information used for a Perceptual color conversion. The perceptual color conversion focuses on tone reproduction and is thus mostly used for a conversion of photographic images with a wide color gamut. An A2B1 tag and a B2A1 tag illustrated in FIG. 4 are information used for a Media-Relative Colorimetric color conversion or an Absolute Colorimetric color conversion. The colorimetric color conversion is faithful to colorimetric values, and is thus mostly used for a conversion for digital-proof color calibration output for which accurate color matching is desired. An A2B2 tag and a B2A2 tag illustrated in FIG. 4 are information used for a color conversion focusing on Saturation. The color conversion focusing on saturation focuses more on saturation of colors than on the accuracy of hue and is mostly used for a conversion of graph display and the like in business graphics.

5. SPECIFIC EXAMPLE OF PROCESS EXECUTED BY PROFILE ADJUSTMENT SYSTEM

FIG. 5 illustrates a color conversion module setting process to be executed by the host apparatus 100 illustrated in FIG. 1. Note that the host apparatus 100 executes a plurality of processes in parallel based on multitasking. The processes described in the specific example may be properly changed, e.g., reordered. The color conversion module setting process includes setting one of the one or more color conversion modules 700 stored in the storage area 114a, as the target module 710 that is a color conversion module to be used. Here, the color conversion module setting process corresponds to the module setting step ST1, the module setting function FU1, and the module setting unit U1.

When the color conversion module setting process illustrated in FIG. 5 is started, the host apparatus 100 acquires information about the one or more color conversion modules 700 stored in the storage area 114a set as an area where the color conversion modules are stored (step S102, the description of "step" is hereinafter omitted). The information about the color conversion modules 700 may be information identifying each color conversion module 700, and may include information representing the vendor of the RIP 400 (see FIG. 5) and the name of a typical file for the color conversion module 700.

After acquiring the information about the color conversion modules 700, the host apparatus 100 causes the display apparatus 130 to display a module selection section 760 in which the list LT0 of the color conversion modules 700 can be displayed based on the information (S104). FIG. 5 schematically illustrates the module selection section 760 displayed by the display apparatus 130. The module selection section 760 is a pull-down user interface, and the list LT0 of the color conversion modules 700 is displayed in the module selection section 760 as a pull-down menu. The list LT0 illustrated in FIG. 5 includes a "Company A RIP" using the color conversion module 701, a "Company B RIP" using the color conversion module 702, and a "Company C RIP" using the color conversion module 703.

After outputting the information of the module selection section 760, the host apparatus 100 accepts, via the input device 115, an operation of selecting, from the list LT0 in the module selection section 760, the target module 710 that is a color conversion module to be used (S106). The user may perform, via the input device 115, the operation of selecting the target module 710 to be used, from the list LT0 displayed in the pull-down menu. FIG. 5 illustrates that "Company A RIP" i.e., the color conversion module 701, has been selected as the target module 710.

As described above, the host apparatus 100 accepts the operation of determining the target module 710 by selection from the list LT0.

Furthermore, as illustrated in FIG. 25, the to-be-used module 710 may be automatically set based on the to-be-adjusted profile 550 selected from the profile 500 regardless of the operation. FIG. 25 illustrates another color conversion module setting process to be executed by the host apparatus 100. The process illustrated in FIG. 25 uses the information of the to-be-adjusted profile 550 and may thus be executed immediately after the to-be-adjusted profile 550 is set in S204 of a profile adjustment process described below (see FIG. 12).

As illustrated in FIG. 25, the RIP vendor name of the RIP used at the time of creation of the to-be-adjusted profile 550 is assumed to be described in the private tag 523 of the set to-be-adjusted profile 550. In this case, the host apparatus 100 may read the to-be-adjusted profile 550 to acquire the RIP vendor name from the private tag 523 (S122). The host apparatus 100 then searches the one or more color conversion modules 700 stored in the storage area 114a to find a color conversion module in which the RIP vendor name acquired in S122 is described, and determines the found color conversion module to be the to-be-used module 710 (S124). The host apparatus 100 may subsequently execute processes in S108 to S114 illustrated in FIG. 5.

Moreover, in a case where the color conversion module in which the RIP vendor name acquired in S122 is described is stored in the storage area 114a, the color conversion module in which the RIP vendor name is described may be set as an initial value for the target module 710 and processes in S102 to S114 illustrated in FIG. 5 may then be executed.

Note that the information for identifying the color conversion module is not limited to the RIP vendor name but may be replaced with any of various elements such as a software name which allow the target module 710 to be determined.

After accepting the target module 710 in S106 illustrated in FIG. 5 or automatically determining the target module 710 in S124 illustrated in FIG. 25, the host apparatus 100 stores, in the storage device 114 (or the RAM 113 or the like), the module setting information 750 indicating the target module 710 (S108). As described above, the host apparatus 100 sets the target module 710.

The process in S110 and the subsequent steps may be omitted. However, the color conversion module 709 (see FIG. 2) used for the RIP 400 installed in the host apparatus 100 may be precluded from being selected from the module selection section 760. The reason will be described below.

FIG. 6 is a diagram schematically illustrating an example of specification information 770 about the color conversion modules used by each RIP. In FIG. 6, "Company A RIP", "Company B RIP", "Company C RIP", and "Company D RIP" represent the names of the RIPs. "Interpolation method" represents n-point interpolation in a three-dimensional color conversion table (hereinafter referred to as $n_3$-point interpolation). N-point interpolation in a four-dimensional color conversion table (hereinafter referred to as $n_4$-point interpolation) is $n_4=2\times n_3$. Therefore, in a case where the "interpolation method" is specified to be 4-point interpolation, an interpolation calculation with $n_3=4$ points is executed in the three-dimensional color conversion table, and an interpolation calculation with $n_4=8$ points is executed in the four-dimensional color conversion table. "Conversion path" indicates whether or not PCS CS3 is passed through when the CMYK color space (CS1) is converted into the cmyk color space (CS2). "DLT" indicates the device link table 631, and "Number of grip points in DLT" indicates the number of grid points in axis directions (C axis direction, M axis direction, Y axis direction, and K axis direction) in the CMYK color space (CS1) of the device link table 631. For example, the color conversion module 701 used for the "Company A RIP" adopts the "8-point interpolation" as a color conversion interpolation method, adopts a "direct conversion" as a color conversion path (an example of the second conversion setting), and adopts "17" as the number of grid points in the axis directions in the input color space of the device link table 631. Furthermore, the color conversion module 702 used for the "Company B RIP" adopts the "4-point interpolation" as a color conversion interpolation method, adopts a "sequential conversion" as a color conversion path (an example of the first conversion setting), and adopts "33" as the number of grid points in the axis directions in the input color space of the device link table 631.

Figure 7:
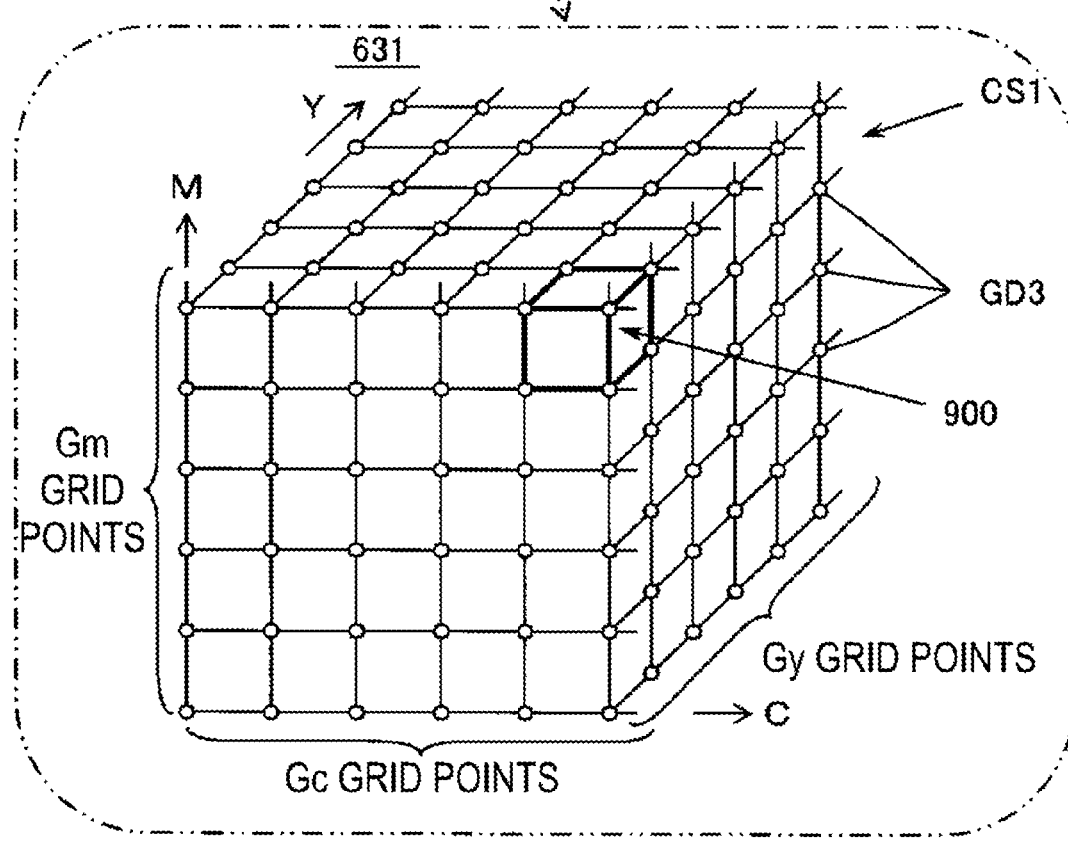
FIG. 7 is a block diagram schematically illustrating a structure example of a conversion table of a profile.

First, the number of grid points in the color conversion table of the profile will be described with reference to FIG. 7. FIG. 7 schematically illustrates the structure of the device link table 631. A lower portion of FIG. 7 schematically illustrates the positions of grid points GD3 in the CMYK color space (CS1). Here, the CMYK color space is a four-dimensional color space, and thus, FIG. 7 illustrates a three-dimensional virtual space formed by a C axis, an M axis, and a Y axis. Furthermore, the number of grid points in the device link table 631 may be changed, and thus, grid points GD1 in the device link table 631 illustrated in FIG. 3 are denoted by the different reference numeral in FIG. 7. The grid points GD3 in the device link table 631 are typically arranged in the CMYK color space at substantially equal intervals in the C axis direction, the M axis direction, the Y axis direction, and the K axis direction. In the lower portion of FIG. 7, the number of grid points GD3 in the C axis direction is denoted as Gc, the number of grid points GD3 in the M axis direction is denoted as Gm, and the number of grid points GD3 in the Y axis direction is denoted as Gy. Although not illustrated in the drawings, the number of grip points GD3 in the K axis direction is denoted as Gk. The number of grid points in the device link table 631 is Gc×Gm×Gy×Gk. The "Company A RIP" illustrated in FIG. 6 adopts Gc=Gm=Gy=Gk=17 as the number of grid points in the device link table 631. Of course, at least some of the numbers of grid points in the axis directions Gc, Gm, Gy, and Gk may be changed.

Although not illustrated in the drawings, grid points GD1 in the A2B table 611 (see FIG. 3) of the input profile 610 are typically arranged in the CMYK color space at substantially equal intervals in the C axis direction, the M axis direction, the Y axis direction, and the K axis direction. When the numbers of grid points GD1 in the C, M, Y, and K axis directions are denoted as Gc, Gm, Gy, and Gk, the number of grid points in the four-dimensional A2B table 611 is Gc×Gm×Gy×Gk. Of course, at least some of the numbers of grid points in the axis directions Gc, Gm, Gy, and Gk may be changed. The A2B table of the output profile 620 is also a four-dimensional color conversion table, and has a similar number of grid points.

Grid points GD2 in the B2A table 621 of the output profile 620 (see FIG. 3) are typically arranged in the Lab color space (CS3) at substantially equal intervals in an L axis direction, an axis direction and a b axis direction. When the numbers of grid points GD2 in the L, a, and b axis directions are denoted as GL, Ga, and Gb, the number of grid points in the three-dimensional B2A table 621 is GL×Ga×Gb. Of course, at least some of the numbers of grid points in the axis directions GL, Ga, and Gb may be changed. The B2A table of the input profile 610 is also a three-dimensional color conversion table, and has a similar number of grid points.

Now, an interpolation method for color conversion will be described with reference to FIGS. 8A to 8D. FIGS. 8A to 8D are diagrams schematically illustrating an example of n-point interpolation (n is an integer of 4 or larger) in a three-dimensional color conversion table or a virtual space. A grid 900 illustrated in FIGS. 8A to 8D is a hexahedron including, as vertexes, 2×2×2=8 grid points GD0 adjacent to one another in the axis directions of the three-dimensional color space or the virtual space. In FIGS. 8A to 8D, empty circles denote grid points GD0, filled circles denote grid points GD10 used to interpolate output coordinate values, and filled triangular marks each denote the position of a set of input coordinate values Ip. The n-point interpolation refers to interpolation executed based on output coordinate values and weight coefficients for each grid point used GD10 when output coordinate values are obtained that corresponds to the input coordinate values Ip at a position included in a polyhedron including a plurality of grid points used GD10 as vertexes.

Figure 8A:
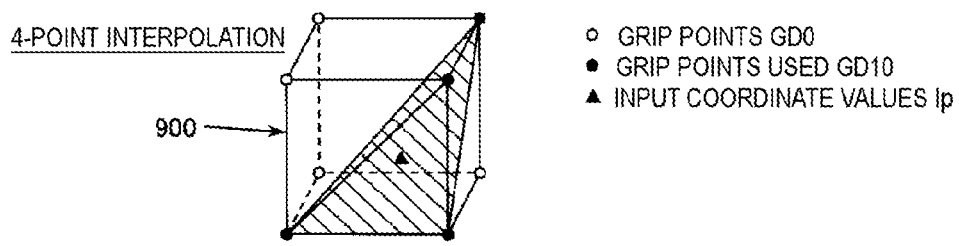
FIGS. 8A to 8D are diagrams illustrating examples of n-point interpolation for output coordinate values.
Figure 8B:
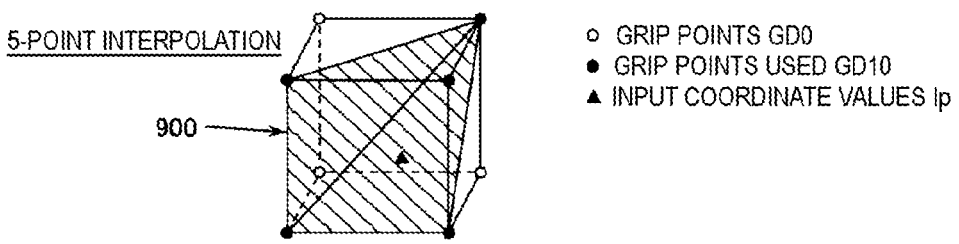
Figure 8C:
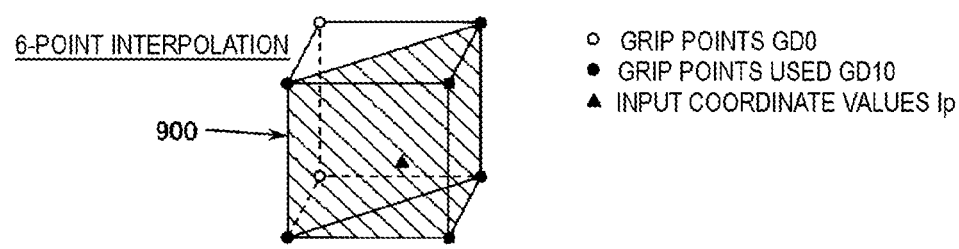
Figure 8D:
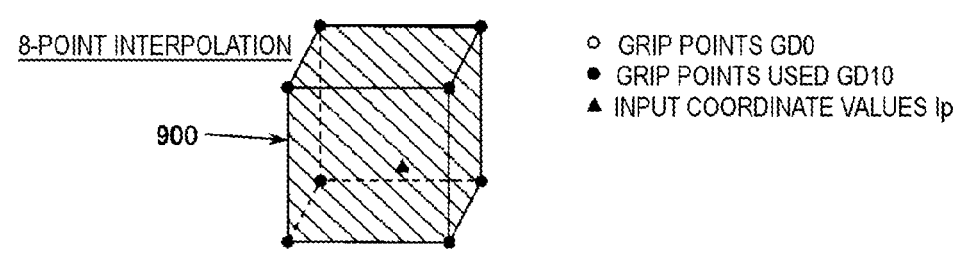

Four-point interpolation illustrated in FIG. 8A is also referred to as tetrahedral interpolation, and uses output coordinate values and weight coefficients for $n_3=4$ grid points GD10 at vertexes of six trigonal pyramids into which the grid 900 is divided. Five-point interpolation illustrated in FIG. 8B is also referred to as pyramidal interpolation, and uses output coordinate values and weight coefficients for $n_3=5$ grid points GD10 at vertexes of a quadrangular pyramid included in the grid 900. Six-point interpolation illustrated in FIG. 8C is also referred to as triangular prism interpolation, and uses output coordinate values and weight coefficients for $n_3=6$ grid points GD10 at vertexes of two triangular prisms into which the grid 900 is divided. Eight-point interpolation illustrated in FIG. 8D is also referred to as hexahedral interpolation, and uses output coordinate values and weight coefficients for $n_3=8$ grid points GD10 at vertexes of the grid 900, which is a hexahedron.

The weight coefficient for each grid point GD10 may be determined by a well-known method. For example, it is assumed that Li is a distance from the position of the set of input coordinate values Ip to each grid point GD10. The variable i in this case is a variable that identifies the grid point used GD10. In a case where any of the grid points GD10 has Li=0, the output coordinate values for the grid point GD10 with Li=0 may be the output coordinate values corresponding to the input coordinate values Ip. In a case where none of the grid points GD10 have Li=0, the sum of reciprocals 1/Li of the distances may be defined as $S_{1/Li}$, the weight for each grid point GD10 may be defined as $1/Li/S_{1/Li}$, and the sum of the output coordinate values for the grid points GD10 multiplied by the weights may be the output coordinate values corresponding to the input coordinate values Ip.

Of course, each weight coefficient may be, e.g., the volume ratio of solids into which a solid including the grid points GD10 as vertexes is divided by a plane passing through the position of the set of input coordinate values Ip. For example, rectangular interpolation that is 8-point interpolation is a calculation including dividing, for each axis of the input color space, the grid 900 into eight rectangular parallelepipeds by a plane orthogonal to the axis direction and setting the weight coefficient for each grid point GD10 equal to the volume ratio of each resultant rectangular parallelepiped.

Figure 9:
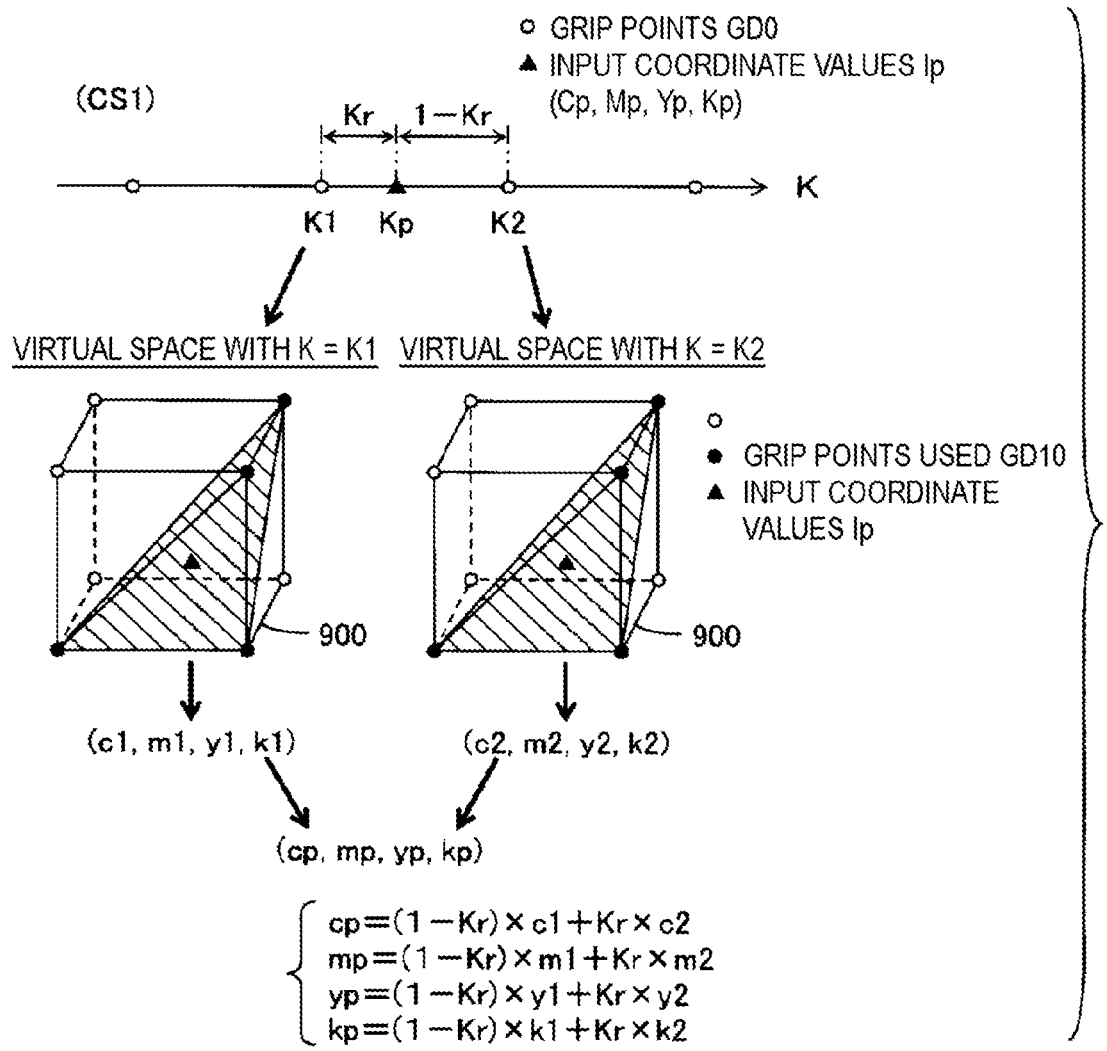
FIG. 9 is a diagram schematically illustrating an example of n-point interpolation in a four-dimensional color conversion table.

FIG. 9 is a diagram schematically illustrating an example of n-point interpolation in a four-dimensional color conversion table. FIG. 9 illustrates an example of $n=2\times n_3$ interpolation in the device link table 631.

In an upper portion of FIG. 9, the position of the set of input coordinate values Ip (Cp, Mp, Yp, Kp) is denoted by a filled triangle mark on the K axis in the CMYK color space (CS1). In the K axis direction, the positions of grid points GD0 adjacent to the set of input coordinate values Ip on opposite sides are denoted by K1 and K2. In this case, K1<K2. Furthermore, it is assumed that $(Kp-K1):(K2-Kp)=Kr:(1-Kr).$ In this case, 0≤Kr≤1.

When K=K1 or K2 is fixed, a three-dimensional virtual space expressed by the C axis, the M axis, and the Y axis may be assumed. First, in a three-dimensional virtual space where K=K1 as illustrated on the left of middle of FIG. 9, an interpolation calculation with $n_3=4$ points is executed. This case may use the output coordinate values and the weight coefficients for the four grid points GD10 at the vertexes of each of six trigonal pyramids into which the grid 900 has been divided as described above. The result is denoted as cmyk values (c1, m1, y1, k1). Furthermore, in a three-dimensional virtual space where K=K2 as illustrated on the right of middle of FIG. 9, an interpolation calculation with $n_3=4$ points is executed. This case may also use the output coordinate values and the weight coefficients for the four grid points GD10 at the vertexes of each of six trigonal pyramids into which the grid 900 has been divided as described above. The result is denoted as cmyk values (c2, m2, y2, k2).

The final output coordinate values (cp, mp, yp, kp) corresponding to the input coordinate values Ip may be determined by applying, to the input coordinate values Ip, weights corresponding to the position of the set of input coordinate value Ip on the K axis.

$$cp=(1-Kr)\times c1+Kr\times c2$$

$$mp=(1-Kr)\times m1+Kr\times m2$$

$$yp=(1-Kr)\times y1+Kr\times y2$$

$$kp=(1-Kr)\times k1+Kr\times k2$$

Interpolation for a four-dimensional color conversion table may be an interpolation calculation with n=2×5 points, n=2×6 points, or n=2×8 points instead of n=2×4 points. An interpolation calculation with n=2×5 points may be executed using, e.g., the output coordinate values and the weight coefficients for $n_3$=5 grid points GD10 illustrated in FIG. 8B, with K=K1 and K2. An interpolation calculation with n=2×6 points may be executed using, e.g., the output coordinate values and the weight coefficients for $n_3$=6 grid points GD10 illustrated in FIG. 8C, with K=K1 and K2. An interpolation calculation with n=2×8 points may be executed using, e.g., the output coordinate values and the weight coefficients for $n_3$=8 grid points GD10 illustrated in FIG. 8D, with K=K1 and K2.

Furthermore, instead of the $n_3$-point interpolation calculation in the three-dimensional virtual space with the K value fixed, an interpolation calculation may be performed in which four grid points surrounding the set of input coordinate values Ip are selected from the four-dimensional color conversion table.

Of course, besides the device link table 631, the four-dimensional color conversion table such as the A2B table 611 of the input profile 610 or the A2B table of the output profile 620 may similarly be used for the interpolation calculation.

Now, a color conversion path will be described with reference to FIG. 10. FIG. 10 schematically illustrates an example of switching between color conversion paths.

In a case where the RIP 400 is used to convert input coordinate values $CMYK_{in}$ in the CMYK color space (CS1) into output coordinate values $cmyk_p$ in the cmyk color space (CS2), the following conversion paths are possible.

(First Conversion Path) A conversion path involving passage through the Lab color space (CS3). Specifically, the first conversion path is a path through which the input coordinate values $CMYK_{in}$ are converted into PCS values $Lab_s$ with reference to the A2B table 611 of the input profile 610 and through which the PCS values $Lab_s$ is further converted into output coordinate values $cmyk_p$ with reference to the B2A table 621 of the output profile 620. The first conversion path corresponds to a first conversion setting.

(Second Conversion Path) A conversion path avoiding the passage through the Lab color space (CS3). Specifically, the second conversion path is a path through which the input coordinate values $CMYK_{in}$ are directly converted into the output coordinate values $cmyk_p$ with reference to the device link table 631. The second conversion path corresponds to a second conversion setting.

The first conversion path involves a color conversion process including accurate reproduction, in the printer 200, of color reproduction characteristics of the target printing machine 300. However, the first conversion path involves execution of both the color conversion process referring to the A2B table 611 and the color conversion process referring to the B2A table 621, and thus, the entire process correspondingly takes much time.

The second conversion path needs only one color conversion process referring to the device link table 631, into which the A2B table 611 and the B2A table 621 are combined, correspondingly reducing the time for processing. However, the combination of the A2B table 611 and the B2A table 621 results in a reduced color conversion accuracy.

Note that FIG. 10 illustrates, as an example of the specification of the color conversion module 700, $17^4$ grid points in the A2B table 611 and $33^3$ grid points in the B2A table 621. The A2B table 611 differs from the B2A table 621 in the number of grid points in each axis direction. This is to set the number of grid points in the A2B table 611 in each axis direction smaller than the number of grid points in the B2A table 621 in each axis direction to prevent an excessive increase in the amount of data in the A2B table 611, which has a relatively large number of dimensions. Of course, the number of grid points in the A2B table 611 may be equal to the number of grid points in the B2A table 621. Note that FIG. 10 illustrates, as an example of the specification of the color conversion module 700, $17^4$ grid points in the device link table 631. The number of grid points in the device link table 631 may be the same as or different from the number of grid points in any other conversion table.

However, for some RIPs, the interpolation method, the conversion path, or the number of grids is unknown as is the case with the "Company D RIP" illustrated in FIG. 6. In this case, a certain color conversion module included in the color conversion modules 700 is suitably allowed to be customized to the color conversion module 709. Thus, in this specific example, in a case where the color conversion module 701 for "Company A RIP" is selected as the target module 710, the user may set the interpolation method, the conversion path, and the number of grid points.

With reference back to S110 in FIG. 5, the description is continued. In S110, the host apparatus 100 branches the process depending on whether to customize the target module 710 to be used. In this specific example, in a case where the "Company A RIP" color conversion module 701 is selected as the target module 710, the host apparatus 100 determines a relevant condition to have been met and causes the display apparatus 130 to display such a customized screen 780 as illustrated in FIG. 11 (S112). In a case where any color conversion module other than the color conversion module 701, such as the color conversion module 702 or 703, is selected, the host apparatus 100 ends the color conversion module setting process.

FIG. 11 schematically illustrates a customized screen 780. The customized screen 780 includes an interpolation method selection section 781, a conversion path selection section 782, a number-of-grid-points selection screen 783, a save button 786, and a "Back to Initial Settings" button 787. The host apparatus 100 accepts, via the input device 115, operations on the selection columns 781 to 783 and the buttons 786 and 787. When accepting an operation on the save button 786, the host apparatus 100 adds, to the module setting information 750, the interpolation method, the interpolation path, and the number of grid points accepted through the selection sections 781 to 783 (S114) and ends the color conversion module setting process.

A plurality of selection items in the interpolation method selection section 781 illustrated in FIG. 11 include "4-point interpolation", "5-point interpolation", "6-point interpolation", and "8-point interpolation". Of course, the "4-point interpolation" means that 4-point interpolation is adopted to calculate output coordinate values in a three-dimensional color conversion table, the "5-point interpolation" means that 5-point interpolation is adopted to calculate output coordinate values in a three-dimensional color conversion table, the "6-point interpolation" means that 6-point interpolation is adopted to calculate output coordinate values in a three-dimensional color conversion table, and the "8-point interpolation" means that 8-point interpolation is adopted to calculate output coordinate values in a three-dimensional color conversion table. For a four-dimensional color conversion table, an interpolation calculation with $n_4=2 \times n_3$ points is executed. The host apparatus 100 accepts, via the interpolation method selection section 781, a setting for a target interpolation method 781a to be used which is included in possible n-point interpolation methods for obtaining the output coordinate values when the target module 710 executes a color conversion process. The interpolation method selection section 781 in FIG. 11 illustrates that the "8-point interpolation" ($n_3 8$, $n_4=16$) has been selected as the target interpolation method 781a.

The conversion path selection section 782 illustrated in FIG. 11 includes a "sequential conversion" and a "direct conversion". The "sequential conversion" means a first conversion setting for a color conversion on the first conversion path involving passage through the Lab color space (CS3). The "direct conversion" means a second conversion setting for a color conversion on the second conversion path avoiding the passage through the Lab color space (CS3). The host apparatus 100 accepts, via the conversion path selection section 782, a selection of the first conversion setting involving the passage through the Lab color space (CS3) or the second conversion setting avoiding the passage through the Lab color space (CS3) when the input coordinate values $CMYK_{in}$ are converted into the output coordinate values $cmyk_p$. Here, the selected conversion path is set as a target conversion path 782a. The conversion path selection section 782 in FIG. 11 illustrates that the "sequential conversion" has been selected as the target conversion path 782a.

The number-of-grid-points selection section 783 illustrated in FIG. 11 includes "13", "17", and "33". The "13", the "17", and the "33" respectively mean that the number of grid points in the device link table 631 in each axis direction is set to 13, 17, and 33. The host apparatus 100 accepts, via the number-of-grid-points selection section 783, the setting for the number of grid points in the to-be-adjusted profile to be created. Here, the selected number of grid points is set as the target number-of-grid-points 783a. The number-of-grid-points selection section 783 in FIG. 11 illustrates that the "17" has been selected as the target number-of-grid-points 783a.

The set target module 710 is used to adjust the profile 500.

Figure 12:
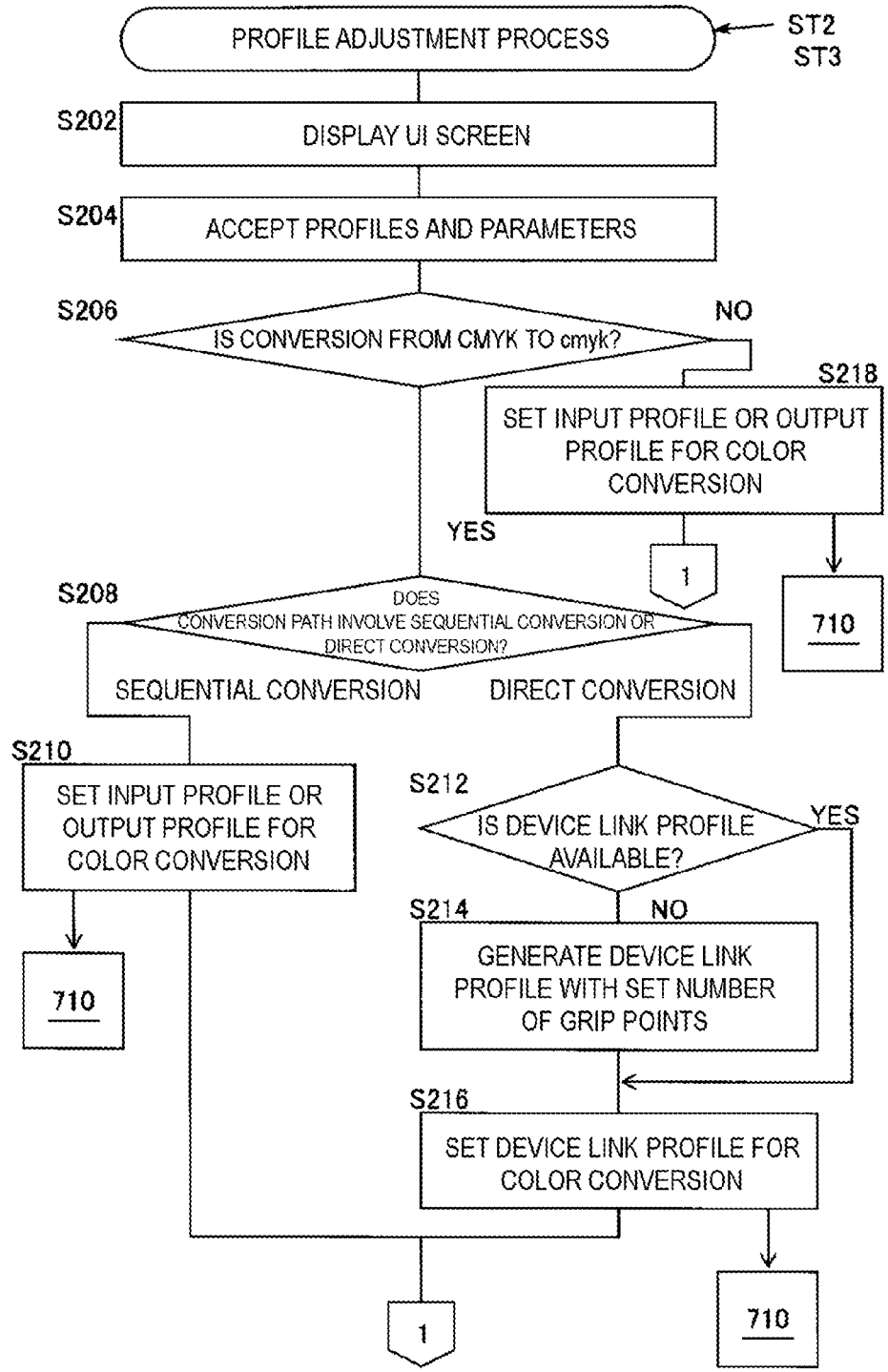
FIG. 12 is a flowchart illustrating an example of a profile adjustment process.
Figure 13:
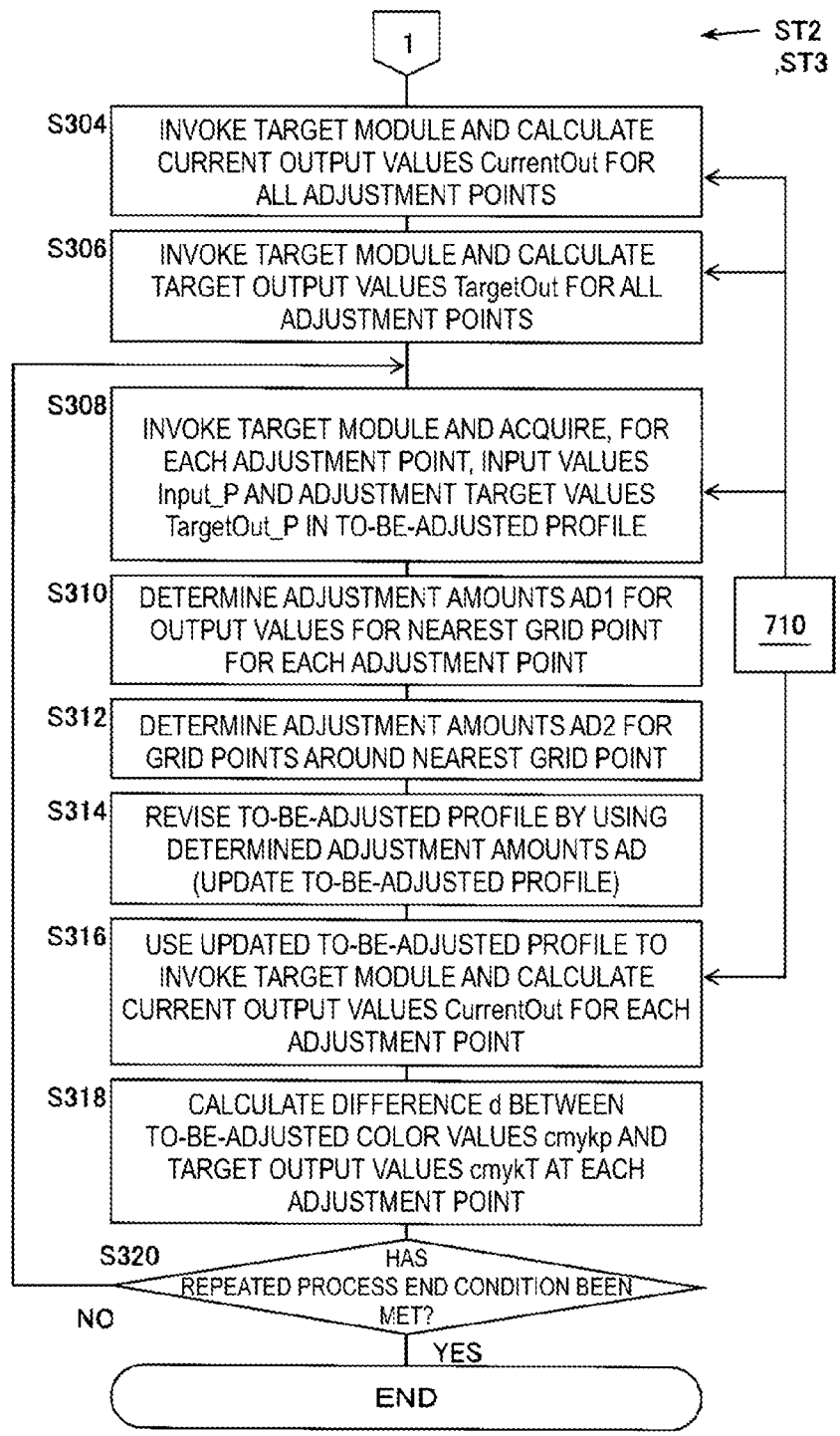
FIG. 13 is a flowchart illustrating an example of the profile adjustment process.
Figure 14:
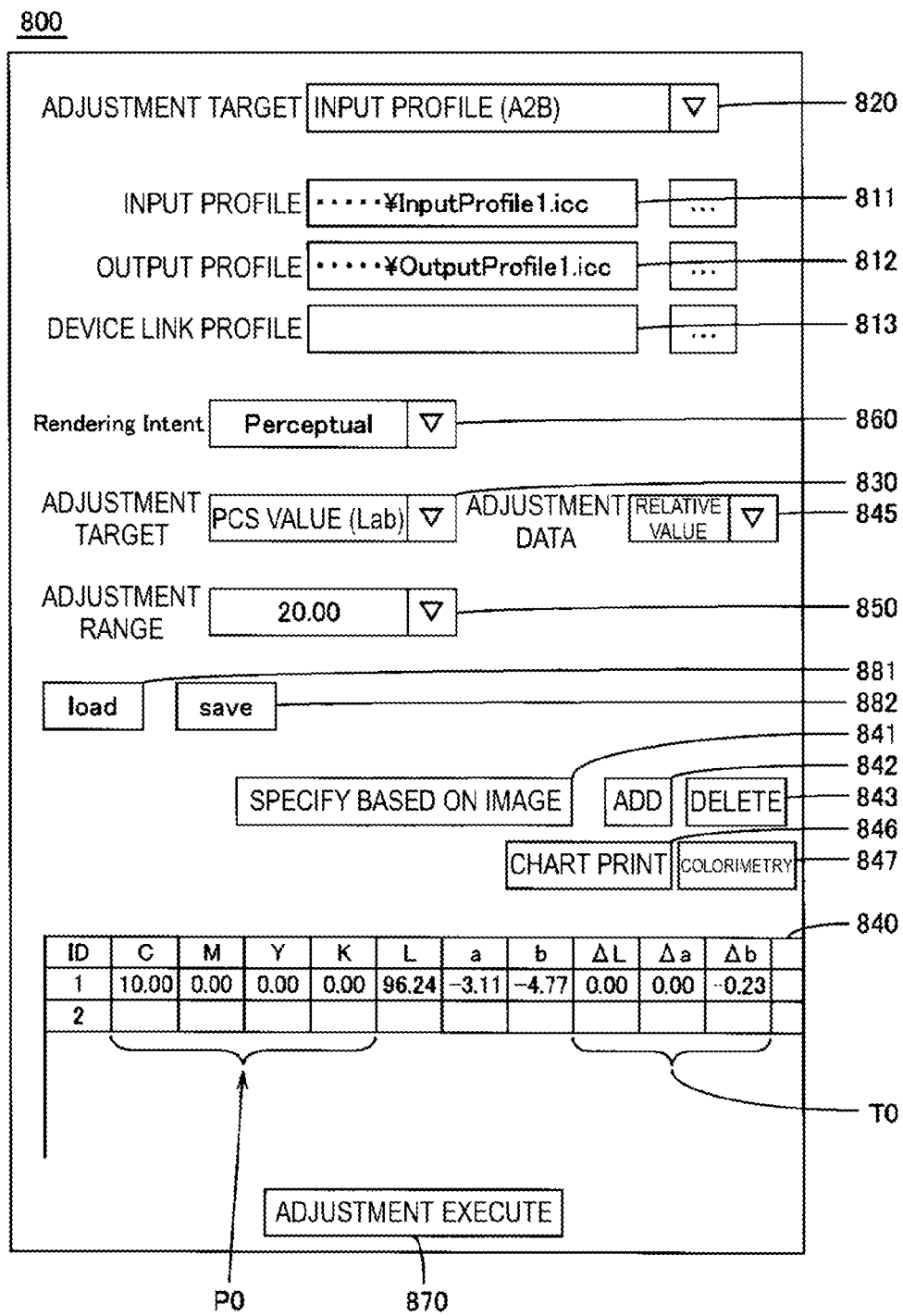
FIG. 14 is a diagram schematically illustrating an example of a user interface screen.

FIG. 12 and FIG. 13 illustrate a profile adjustment process to be executed by the host apparatus 100 illustrated in FIG. 1. FIG. 14 illustrates an example of a user interface (UI) screen 800 displayed in step S202 in FIG. 12. The profile adjustment process illustrated in FIG. 12 and FIG. 13 corresponds to the profile adjustment step ST3, the profile adjustment function FU3, and the profile adjustment unit U3. Furthermore, S304 to S308 and S316 referring to the target module 710 correspond to the color conversion step ST2, the color conversion function FU2, and the color conversion unit U2.

When the profile adjustment process is started, the host apparatus 100 causes the display apparatus 130 to display the UI screen 800 illustrated in FIG. 14 (S202). The UI screen 800 includes an input profile selection section 811, an output profile selection section 812, a device link profile selection section 813, a to-be-adjusted profile specification section 820, a to-be-adjusted color space selection section 830, a target acceptance area 840, a "specify based on image" button 841, an add button 842, a delete button 843, an adjustment data selection section 845, a chart print button 846, a colorimetry button 847, an adjustment range specification section 850, an intent specification section 860, an adjustment execute button 870, a history load button 881, and a history save button 882.

The host apparatus 100 accepts operations on any of the above-described sections and buttons through the input device 115 (S204), and when accepting an operation on the adjustment execution button 870, advances the process to S304.

When accepting an operation on the input profile selection section 811 through the input device 115, the host apparatus 100 can cause the display apparatus 130 to display a list of the input profiles 610 stored in the storage device 114. The host apparatus 100 accepts, from the input device 115, one input profile in the displayed list of the input profiles 610 as an input profile for color conversion.

Furthermore, when accepting an operation on the output profile selection section 812 through the input device 115, the host apparatus 100 can cause the display apparatus 130 to display a list of the output profiles 620 stored in the storage device 114. The host apparatus 100 accepts, from the input device 115, one output profile in the displayed list of the output profiles 620 as an output profile for color conversion.

Furthermore, when accepting an operation on the device link profile selection section 813 through the input device 115, the host apparatus 100 can cause the display apparatus 130 to display a list of the device link profiles 630 stored in the storage device 114. The host apparatus 100 accepts, from the input device 115, one output profile in the displayed list of the device link profiles 630 as an output profile for color conversion.

When accepting an operation on only one of the selection sections 811 to 813, the host apparatus 100 sets, as the to-be-adjusted profile, the profile corresponding to the selection section via which the operation has been accepted, and causes the display apparatus 130 to display information indicating the to-be-adjusted profile on the to-be-adjusted profile specification section 820. In a case where the input profile 610 and the output profile 620 are selected in the selection sections 811 and 812 as illustrated in FIG. 14, one of a plurality of specification items in the to-be-adjusted profile specification section 820 may be selected. The plurality of specification items includes the input profile 610, the output profile 620, and the device link profile 630. Note that, in a case where the first conversion path referring to the input profile 610 and the output profile 620 is set for the target module 710, CMYK values are converted into cmyk values with reference to the selected input profile 610 and output profile 620. In a case where the second conversion path referring to the device link profile 630 is set for the target module 710, a process for generating the device link profile 630 from the input profile 610 and the output profile 620 is executed (see FIG. 14). Moreover, CMYK values are converted into cmyk values with reference to the device link profile 630.

In a case where all of the profiles 610, 620, and 630 are selected in the selection sections 811 to 813, one of the specification items including the profiles 610, 620, and 630 may be selected in the to-be-adjusted profile specification section 820. Note that, in a case where the first conversion path referring to the input profile 610 and the output profile 620 is set for the target module 710, CMYK values are converted into cmyk values with reference to the selected input profile 610 and output profile 620. In a case where the second conversion path referring to the device link profile 630 is set for the target module 710, CMYK values are converted into cmyk values with reference to the selected device link profile 630.

A plurality of selection items in the to-be-adjusted color space selection section 830 illustrated in FIG. 14 include "input data", "output data", and "PCS value". The "input data" is an item for selecting the CMYK color space (CS1) as a to-be-adjusted color space CS6. The "output data" is an item for selecting the cmyk color space (CS2) as the to-be-adjusted color space CS6. The "PCS value" is an item for selecting the Lab color space (CS3) as the to-be-adjusted color space CS6. The host apparatus 100 accepts, from the input device 115, one of the "input data", the "output data", and the "PCS value" as the to-be-adjusted color space CS6. Note that, in a case where, among the selection sections 811 to 813, acceptance occurs only in the input profile selection section 811 for the input profile, the plurality of selection items in the to-be-adjusted color space selection section 830 may lack "output data". In a case where, among the selection sections 811 to 813, acceptance occurs only in the output profile selection section 812 for the output profile, the plurality of selection items in the to-be-adjusted color space selection section 830 may lack "input data".

The host apparatus 100 executes a process for changing the input item of the target acceptance area 840 according to the selection in the to-be-adjusted color space selection section 830. Furthermore, the host apparatus 100 executes a process for changing the input item of the target acceptance area 840 according to the selection in the adjustment data selection section 845. In the adjustment data selection section 845, either one of "absolute value" and "relative value" can be selected. The "absolute value" is an option allowing the adjustment target T0 to be accepted as a coordinate value in the color space. The "relative value" is an option allowing the adjustment target T0 to be accepted as a difference from the current coordinate value in the color space.

First, in a case where the specification of the "PCS value" in the adjustment data selection section 845 is accepted, i.e., in a case where the to-be-adjusted color space CS6 is the PCS CS3, the following process is executed.

When accepting the "relative value" in the adjustment data selection section 845, the host apparatus 100 causes an input section for the coordinate values (ΔL, Δa, Δb) of the adjustment target T0, as relative values (denoted by $\Delta Lab_{T-p}$) relative to the current coordinate values in the PCS CS3, to be displayed in the target acceptance area 840, as illustrated in FIG. 14. Furthermore, when accepting the "absolute value" in the adjustment data selection section 845, the host apparatus 100 causes an input section for the coordinate values (denoted by T_L, T_a, T_b) of the adjustment target T0 along with a display section for the current coordinate values (denoted by C_L, C_a, C_b) in the PCS CS3 to be displayed in the target acceptance area 840.

In a case where the specification of the "input data" in the adjustment data selection section 845 is accepted, i.e., in a case where the to-be-adjusted color space CS6 is the CMYK color space (CS1), the following process is executed.

When accepting the "relative value" in the adjustment data selection section 845, the host apparatus 100 causes an input section for the coordinate values (denoted by ΔC, ΔM, ΔY, ΔK) of the adjustment target T0 as relative values (denoted by $\Delta CMYK_{T-p}$) relative to the current coordinate values in the CMYK color space (CS1), to be displayed in the target acceptance area 840. Furthermore, when accepting the "absolute value" in the adjustment data selection section 845, the host apparatus 100 causes an input section for the coordinate values (denoted by T_C, T_M, T_Y, T_K) of the adjustment target T0 along with a display section for the current coordinate values (denoted by C_C, C_M, C_Y, C_K) in the CMYK color space (CS1) to be displayed in the target acceptance area 840.

In a case where the specification of the "output data" in the adjustment data selection section 845 is accepted, i.e., in a case where the to-be-adjusted color space CS6 is the cmyk color space (CS2), the following process is executed.

When accepting the "relative value" in the adjustment data selection section 845, the host apparatus 100 causes an input section for the coordinate values (denoted by Δc, Δm, Δy, Δk) of the adjustment target T0 as relative values (denoted by $\Delta cmyk_{T-p}$) relative to the current coordinate values in the cmyk color space (CS2) to be displayed in the target acceptance area 840. Furthermore, when accepting the "absolute value" in the adjustment data selection section 845, the host apparatus 100 causes an input section for the coordinate values (denoted by T_c, T_m, T_y, T_k) of the adjustment target T0 along with a display section for the current coordinate values (denoted by C_c, C_m, C_y, C_k) in the cmyk color space (CS2) to be displayed in the target acceptance area 840.

Figure 15:
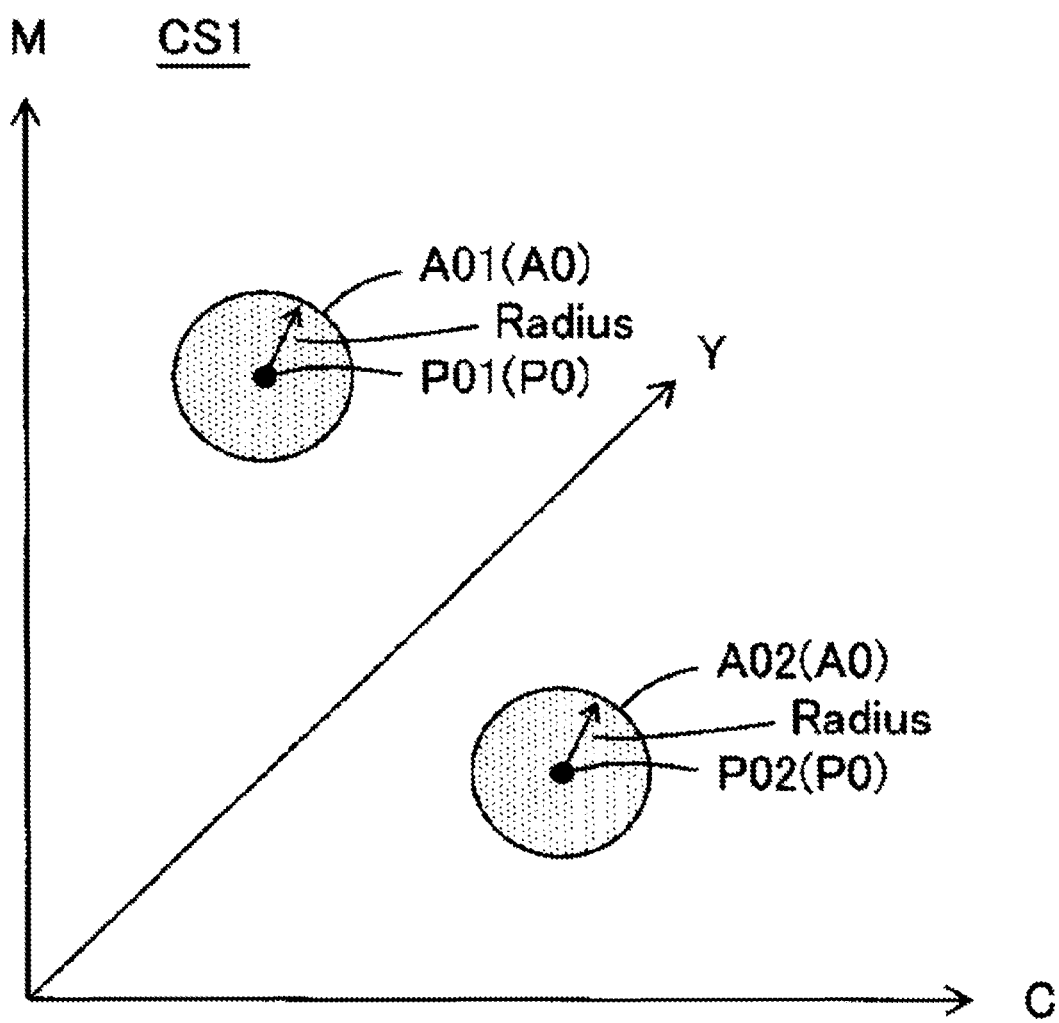
FIG. 15 is a diagram schematically illustrating an example where adjustment points are set.

As illustrated in FIG. 15, the adjustment point P0 for which the adjustment target T0 is to be set is set in the CMYK color space (CS1). Here, the CMYK color space is a four-dimensional color space, and thus, FIG. 15 illustrates a three-dimensional virtual space formed by the C axis, the M axis, and the Y axis. Note that although FIG. 15 illustrates two adjustment points P01 and P02 as the adjustment point P0, one, or three or more adjustment points P0 may be set. For example, when accepting an operation on the "specify based on image" button 841 in the UI screen 800 illustrated in FIG. 14, the host apparatus 100 causes the display apparatus 130 to display a screen schematically depicting the CMYK color space (CS1), and acquires CMYK values corresponding to an operation through the input device 115 to update the information of the target acceptance area 840. When a new adjustment point P0 is specified, the host apparatus 100 provides a corresponding ID (identification information) and causes the acquired CMYK values, Lab values obtained from the CMYK values, and the like to be displayed in the target acceptance area 840 in association with the ID. When the add button 842 is operated, the host apparatus 100 provides an additional ID, and adds, to the target acceptance area 840, an input section corresponding to the added ID. When the delete button 843 is operated, the host apparatus 100 accepts a specification of an ID to be deleted, and deletes the input section corresponding to the specified ID.

Furthermore, when accepting an operation on the chart print button 846, the host apparatus 100 generates print data of the color chart CH1 with color patches each representing the color of corresponding adjustment point P0 and transmits the print data to the printer 200. The printer 200 receives the print data and then prints, on a print substrate ME1, the color chart CH1 with the color patches each representing the color of corresponding adjustment point P0.

Moreover, when accepting an operation on the colorimetry button 847, the host apparatus 100 instructs the colorimetric apparatus 120 to execute a colorimetric process on each patch of the color chart CH1. The colorimetric apparatus 120 receives the instruction, then executes a colorimetric process on each patch of the color chart CH1, and transmits the colorimetric values ($Lab_p$) of each patch to the host apparatus 100. The host apparatus 100 receives the colorimetric values (Lab$_p$) and may then cause the display apparatus 130 to display the colorimetric values (Lab$_p$) or cause the printer 200 to print the colorimetric values (Lab$_p$). A user may view the output colorimetric values (Lab$_p$) and input the adjustment target T0 to the target acceptance area 840. Furthermore, the host apparatus 100 may automatically input the colorimetric values (Lab$_p$) of each patch to an input section for the target T0. In a case where the adjustment target T0 is the relative value (ΔL, Δa, Δb), the host apparatus 100 may calculate differences between the components L, a, and b of the target colorimetric values Lab$_T$ and the components L, a, and b of the current colorimetric values Lab$_p$ and automatically input the differences to the input section for the target T0.

Moreover, when accepting an operation on the history load button 881, the host apparatus 100 reads an adjustment history stored in the storage device 114, and adds the adjustment history to the target acceptance area 840. When an operation on the history save button 882 is accepted, the host apparatus 100 stores the information of the target acceptance area 840 in the storage device 114 as an adjustment history.

Moreover, the host apparatus 100 accepts, in the adjustment range specification section 850, an input of a Radius on the assumption that the adjustment point P0 is a base point. The radius is represented, e.g., as a relative Euclid distance value 0 to 100% in the first color space CS1. Consequently, the adjustment range A0 of the input profile 610 is specified in the first color space CS1.

FIG. 15 schematically illustrates an example of the adjustment range A0 in a case where the Radius is specified. The adjustment range A0 is set for each adjustment point P0. In the example illustrated in FIG. 15, an adjustment range A01 is set for the adjustment point P01, and an adjustment range A02 is set for the adjustment point P02. The host apparatus 100 is capable of accepting, in the target acceptance area 840, an input of the adjustment range A0 of each adjustment point P0.

Moreover, the host apparatus 100 accepts, in the intent specification section 860, a specification of a rendering intent for defining the correspondence relationship for the input profile 610. Although illustration is omitted in the drawing, a plurality of specification items for the intent specification section 860 illustrated in FIG. 14 are three types of items: "Perceptual", "Relative Colorimetric", and "Saturation". Of course, the specification items may include "Absolute Colorimetric", or any of "Perceptual", "Relative Colorimetric", and "Saturation" may be omitted from the specification items. FIG. 14 illustrates an example where "Perceptual" is specified as a specified intent.

When accepting an operation on the adjustment execution button 870 illustrated in FIG. 15, the host apparatus 100 executes a process in S206 in FIG. 12 and the subsequent steps. The host apparatus 100 first branches the process depending on whether or not the color conversion is from CMYK values into cmyk values (S206). In a case where only the input profile 610 or only the output profile 620 is set in the profile selection sections 811 to 813 in FIG. 14, the color conversion is not from CMYK values into cmyk values. In this case, the host apparatus 100 sets the input profile 610 or the output profile 620 selected in the profile selection sections 811 and 812, in the target module 710 as a profile for color conversion (S218), and advances the process to S304 in FIG. 13. In a case where only the device link profile 630, a combination of the input profile 610 with the output profile 620, or a combination of the input profile 610, the output profile 620, and the device link profile 630 is set in the profile selection sections 811 to 813 in FIG. 14, the color conversion is from CMYK values into cmyk values. In this case, the host apparatus 100 advances the process to S208.

In S208, the host apparatus 100 branches the process depending on whether or not the conversion path from CMYK values to cmyk values involves a "sequential conversion" (first conversion setting) including the passage through the Lab color space (CS3) or a "direct conversion" (second conversion setting) avoiding the passage through the Lad color space (CS3).

In a case where, in the profile selection sections 811 to 813 in FIG. 14, at least the input profile 610 and the output profile 620 are set and the "sequential conversion" is set for the conversion path for the target module 710, the conversion path involves the "sequential conversion". In this case, the host apparatus 100 sets the combination of the input profile 610 with the output profile 620 selected in the profile selection sections 811 and 812, in the target module 710 as a profile for color conversion (S210). The host apparatus 100 subsequently advances the process to S304 in FIG. 13.

In a case where the conversion path from CMYK values to cmyk values does not involve the "sequential conversion", i.e., the conversion path involves the "direct conversion", the host apparatus 100 branches the process depending on whether or not the device link profile 630 is set in the device link profile selection section 813 (S212).

In a case where the device link profile 630 is set, the host apparatus 100 advances the process to S216.

In a case where the device link profile 630 is not set, the host apparatus 100 generates the device link profile 630 with the number of grid points set in the target module 710, from the input profile 610 and the output profile 620 set in the profile selection sections 811 and 812 (S214). The host apparatus 100 subsequently advances the process to S216.

The process in S214 described above may be executed, e.g., as follows.

First, the A2B table 611 is read from the input profile 610, and the B2A table 621 is read from the output profile 620. Gc×Gm×Gy×Gk grid points GD3 in the device link table 631 (see FIG. 7) are then set in accordance with the number of grid points GD set in the target module 710. For example, in a case where the number of grid points set in the target module 710 is "33", Gc×Gm×Gy×Gk=33 grid points GD3 are set. Input coordinate values (denoted as Ci, Mi, Yi, Ki) for each grid point GD3 are then converted into Lab values (denoted as Li, ai, bi) with reference to the A2B table 611. An interpolation calculation is executed as needed to obtain the Lab values Li, ai, and bi in accordance with the interpolation method set in the target module 710. The Lab values (Li, ai, bi) are then converted into cmyk values (denoted as ci, mi, yi, and ki) with reference to the B2A table 621. An interpolation calculation is executed as needed to obtain the cmyk values ci, mi, yi, ki in accordance with the interpolation method set in the target module 710. The cmyk values (ci, mi, yi, ki) are then stored, as output coordinate values, at the grid point GD3 corresponding to the input coordinate values (Ci, Mi, Yi, Ki) to generate a device link table 631. The device link table 631 is stored in the device link profile 630 to generate a device link profile 630 with the number of grid points set in the target module 710.

Of course, in a case where the number of grid points set in the target module 710 is "17", a device link profile 630 with Gc=Gm=Gy=Gk=17 grid points GD3 is generated. In a case where the number of grid points set in the target module 710 is "13", a device link profile 630 with Gc=Gm=Gy=Gk=13 grid points GD3 is generated. A device link profile 630 with the number of grid points set in the target module 710 is therefore generated regardless of the number of grid points in the A2B table 611 or the B2A table 621.

In S216, the host apparatus 100 sets the device link profile 630 in the target module 710 as a profile for color conversion. In a case where the process in S214 described above is executed, the host apparatus 100 sets the device link profile 630 generated in the processing of S214, in the target module 710 as a profile for color conversion. In a case where the process in S214 described above is not executed, the device link profile 630 selected in the device link profile selection section 813 is set in the target module 710 as a profile for color conversion. The host apparatus 100 subsequently advances the process to S304 in FIG. 13.

A process in S304 and the subsequent steps in FIG. 13 will be described below. Here, in a case where "Perceptual" is specified in the intent specification section 860, the host apparatus 100 uses, in the process in S304 and the subsequent steps, information in the profile 500 based on a perceptual color conversion (e.g., the information indicated by the A2B0 tag and the B2A0 tag illustrated in FIG. 4). In a case where "Relative Colorimetric" is specified in the intent specification section 860, the host apparatus 100 uses, in the process in S304 and the subsequent steps, information in the profile 500, based on a relative colorimetric color conversion (e.g., the information indicated by the A2B1 tag and the B2A1 tag illustrated in FIG. 4). In a case where "Saturation" is specified in the intent specification section 860, the host apparatus 100 uses, in the process in S104 and the subsequent steps, information in the profile 500, based on a saturation-oriented color conversion (e.g., the information indicated by the A2B2 tag and the B2A2 tag illustrated in FIG. 4).

First, for each adjustment point P0 input to the target acceptance area 840, the host apparatus 100 invokes the target module 710 in which the color conversion profile (including the combination of profiles) is set to obtain the current output values CurrentOut (S304). This operation is performed for adjustment based on the output colors (cmyk$_p$) corresponding to the colors of an output image IMO formed on the print substrate ME1.

Each of the color conversion modules 700 causes the host apparatus 100 to implement a function at least to receive, as arguments, input coordinate values in the input color space CS4 for a profile to be used for color conversion and to return output coordinate values in the output color space CS5 for the profile. The target module 710 set as the color conversion module to be used refers to the profile to be used for color conversion, to cause the host apparatus 100 to implement a function to convert the input coordinate values in the input color space CS4 into the output coordinate values in the output color space CS5 in accordance with the set target interpolation method 781a.

Figure 16A:
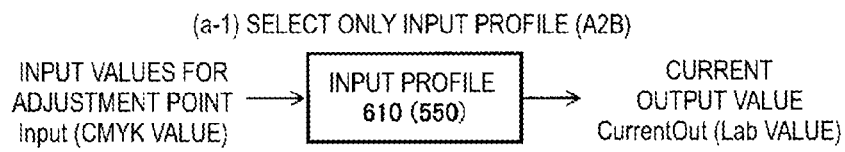
FIGS. 16A to 16E are diagrams schematically illustrating examples of calculation of current output values.

Here, in a case where only the input profile 610 is specified for color conversion (a-1), the input profile 610 is automatically set as the to-be-adjusted profile 550, as illustrated in FIG. 16A. The input values Input for each adjustment point P0 are CMYK values (denoted as Cp, Mp, Yp, Kp), and the current output values CurrentOut are Lab values (denoted as Lp, ap, bp). In this case, the variable p is a variable that identifies the adjustment point P0.

Here, as illustrated in FIG. 17, a conversion in accordance with the profile executed by the color conversion module 700 (e.g., the ICC profile) is to be represented by $f_{icc}$ (a first argument, a second argument, a third argument). The first argument represents a profile used. The first argument includes InputProfile representing an input profile, OutputProfile representing an output profile, and DLProfile representing a device link profile. The second argument represents a color conversion table used for the profile represented by the first argument. The second argument includes A2B representing a conversion from a device color to a device independent color, B2A representing a conversion from a device independent color to a device color, and A2B0 representing a conversion using the device link table. The third argument Input represents the input values (CMYK, RGB, Lab, or the like) of the adjustment point P0.

In the case of (a-1) described above, the current output values CurrentOut can be calculated by the following equation (see FIG. 17).

$$\text{CurrentOut} = f_{icc}(\text{InputProfile}, A2B, \text{Input})$$

The host apparatus 100 causes the target module 710 in which the input profile 610 is set to execute a color conversion process. At this time, the host apparatus 100 passes, to the target module 710, information A2B representing the A2B table 611 and the input values Cp, Mp, Yp, Kp (input coordinate values) to cause the target module 710 to execute the color conversion process, and acquires the output values Lp, ap, bp (output coordinate values) from the target module 710 as the current output values CurrentOut. At this time, the target module 710 refers to the A2B table 611 of the input profile 610 to cause the host apparatus 100 to implement a function to convert the input values Cp, Mp, Yp, Kp into the output values Lp, ap, bp in accordance with the set interpolation method. For example, in a case where the "Company B RIP" color conversion module 702 illustrated in FIG. 6 is set as the target module 710, a process for determining, in each of the virtual spaces with K=K1 and K2, the output coordinate values corresponding to the input coordinate values Ip by using the output coordinate values and the weight coefficients for four grid points GD10 at vertexes of a trigonal pyramid including the position of the set of input coordinate values Ip, as illustrated in FIG. 9. The final output coordinate values are obtained from output coordinate values for K=K1 and K2. The color conversion process described below is similarly executed by invoking the target module 710.

Figure 16B:
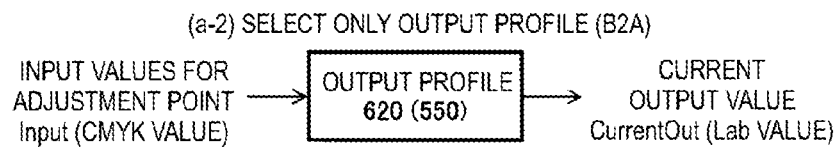

Here, in a case where only the output profile 620 is specified for color conversion (a-2), the output profile 620 is automatically set as the to-be-adjusted profile 550, as illustrated in FIG. 16B. The input values Input for each adjustment point P0 are Lab values (denoted as Lp, ap, bp), and the current output values CurrentOut are cmyk values (denoted as cp, mp, yp, kp). In this case, the current output values CurrentOut can be calculated by the following equation (see FIG. 17).

$$\text{CurrentOut} = f_{icc}(\text{OutputProfile}, B2A, \text{Input})$$

The host apparatus 100 causes the target module 710 in which the output profile 620 is set to execute a color conversion process. At this time, the host apparatus 100 passes, to the target module 710, information B2A representing the B2A table 621 and the input values Lp, ap, bp (input coordinate values) to cause the target module 710 to execute the color conversion process, and acquires the output values cp, mp, yp, kp (output coordinate values) from the target module 710 as the current output values CurrentOut. At this time, the target module 710 refers to the B2A table 621 of the output profile 620 to cause the host apparatus 100 to implement a function to convert the input values Lp, ap, bp into the output values cp, mp, yp, kp in accordance with the set interpolation method. For example, in a case where the "Company B RIP" color conversion module 702 illustrated in FIG. 6 is set as the target module 710, a process for determining, in each of the virtual spaces with K=K1 and K2, the output coordinate values corresponding to the input coordinate values Ip using the output coordinate values and the weight coefficients for the four grid points GD10 at the vertexes of the trigonal pyramid including the position of the set of input coordinate values Ip, as illustrated in FIG. 8A. In a case where the "Company A RIP" color conversion module 701 illustrated in FIG. 6 is set as the target module 710 and the "5-point interpolation" is set as the interpolation method, a process for obtaining the output coordinate values corresponding to the input coordinate values Ip by using the output coordinate values and the weight coefficients for five grid points GD10 at vertexes of a quadrangular pyramid including the position of the set of input coordinate values Ip, as illustrated in FIG. 8B. The color conversion process described below is similarly executed by invoking the target module 710.

Figure 16C:
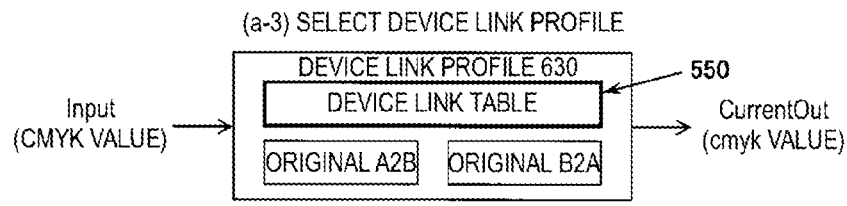

In a case where only the device link profile 630 is specified for color conversion (a-3), the device link profile 630 is automatically set as the to-be-adjusted profile 550, as illustrated in FIG. 16C. The input values Input for each adjustment point P0 are CMYK values (Cp, Mp, Yp, Kp), and the current output values CurrentOut are cmyk values (cp, mp, yp, kp). In this case, the current output values CurrentOut can be calculated by the equation below (see FIG. 17).

$$\text{CurrentOut} = f_{icc}(\text{DLProfile}, A2B0, \text{Input})$$

The host apparatus 100 causes the target module 710 in which the device link profile 630 is set to execute a color conversion process. At this time, the host apparatus 100 passes, to the target module 710, information A2B0 representing the device link table 631 and the input values Cp, Mp, Yp, Kp (input coordinate values) to cause the target module 710 to execute the color conversion process, and acquires the output values cp, mp, yp, kp (output coordinate values) from the target module 710 as the current output values CurrentOut. At this time, the target module 710 refers to the device link profile 630 represented by "DLProfile", to cause the host apparatus 100 to implement a function to convert the input values Cp, Mp, Yp, Kp into the output values cp, mp, yp, kp in accordance with the set interpolation method.

Figure 16D:
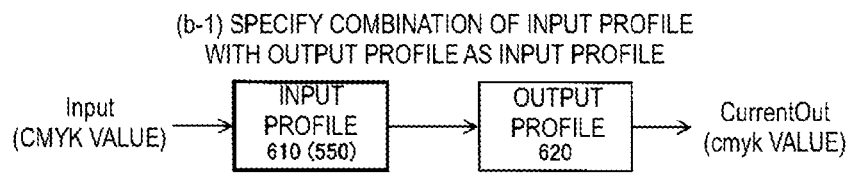
Figure 16E:
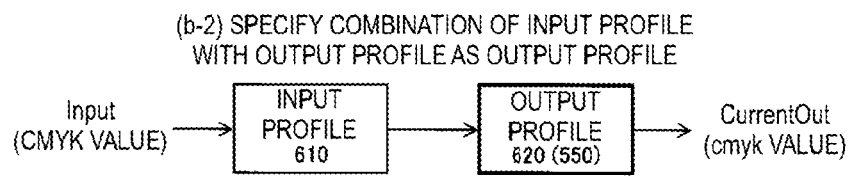

As illustrated in FIG. 16D and FIG. 16E, in a case where the combination of the profiles 610 and 620 is specified for color conversion (b-1) and (b-2), different processes are executed depending on whether the conversion path set in the target module 710 involves the "sequential conversion" or the "direct conversion".

First, a case where the "sequential conversion" is set will be described. In the cases of (b-1) and (b-2) described above, the input values Input for each adjustment point P0 are CMYK values (Cp, Mp, Yp, Kp), and the current output values CurrentOut are cmyk values (cp, mp, yp, kp). In these cases, regardless of whether the adjustment target profile 550 is the input profile 610 or the output profile 620, the current output values CurrentOut can be calculated by the following equation (see FIG. 17).

$$\text{CurrentOut} = f_{icc}(\text{OutputProfile}, B2A, f_{icc}(\text{InputProfile}, A2B, \text{Input}))$$

The host apparatus 100 causes the target module 710 in which the combination of the profiles 610 and 620 is set to execute a color conversion process. At this time, the host apparatus 100 passes input values Cp, Mp, Yp, Kp (input coordinate values) to the target module 710 to cause the target module 710 to execute the color conversion process, and acquires the output values cp, mp, yp, kp (output coordinate values) from the target module 710 as the current output values CurrentOut. At this time, the target module 710 first refers to the A2B table 611 of the input profile 610 to cause the host apparatus 100 to implement a function to convert the input values Cp, Mp, Yp, Kp into the Lab values Lp, ap, bp in accordance with the set interpolation method. The target module 710 then refers to the B2A table 621 of the output profile 620 to cause the host apparatus 100 to implement a function to convert the Lab values Lp, ap, bp into the output values cp, mp, yp, kp in accordance with the set interpolation method. The target module 710 returns the output values cp, mp, yp, kp as a calculation result. The host apparatus 100 acquires the output values cp, mp, yp, kp as the current output values CurrentOut. The color conversion process described below is similarly executed.

As described above, the first conversion setting involving the passage through the Lab color space (CS3) allows for a color conversion process in which the printer 200 having color reproduction characteristics represented by the output profile 620 accurately reproduces color reproduction characteristics of a target printing machine.

With the "direct conversion" set, the target module 710 performs a color conversion referring to the set device link profile 630. The device link profile 630 is obtained by combining the profiles 610 and 620 with each other in S214 in FIG. 12 such that the resultant profile includes a plurality of grid points the number of which is equal to the number of grid points set in the target module 710.

$$\text{CurrentOut} = f_{icc}(\text{DLProfile}, A2B0, \text{Input})$$

The target module 710 refers to the device link table 631 of the device link profile 630 to cause the host apparatus 100 to implement a function to convert the input values Cp, Mp, Yp, Kp into the output values cp, mp, yp, kp in accordance with the set interpolation method. The target module 710 returns the output values cp, mp, yp, kp as a calculation result. The host apparatus 100 acquires the output values cp, mp, yp, kp as the current output values CurrentOut. The color conversion process described below is similarly executed.

As described above, the second conversion setting avoiding the passage through the Lab color space (CS3) needs only one color conversion process referring to the device link profile 630, into which the input profile 610 and the output profile 620 are combined, correspondingly reducing the time for processing.

With all of the profiles 610, 620, and 630 selected, in a case where the combination of the profiles 610 and 620 is specified for color conversion (b-1) and (b-2), different processes are executed depending on whether the conversion path set in the target module 710 involves the "sequential conversion" or the "direct conversion".

With the "sequential conversion" set, the target module 710 performs a color conversion referring to both profiles 610 and 620. The target module 710 first refers to the A2B table 611 of the input profile 610 to cause the host apparatus 100 to implement a function to convert the input values Cp, Mp, Yp, Kp into the output values Lp, ap, bp in accordance with the set interpolation method. The target module 710 then refers to the B2A table 621 of the output profile 620 to cause the host apparatus 100 to implement a function to convert the Lab values Lp, ap, bp into the output values cp, mp, yp, kp in accordance with the set interpolation method. This allows for a color conversion process achieving accurate color reproduction.

With the "direct conversion" set, the target module 710 refers to the device link table 631 to cause the host apparatus 100 to implement a function to convert the input values Cp, Mp, Yp, Kp into the output values cp, mp, yp, kp in accordance with the set interpolation method. This allows for a quick color conversion process.

After calculating the current output values CurrentOut, the host apparatus 100 invokes, for each adjustment point P0 input to the target acceptance area 840, the target module 710 in which the color conversion profile (including the combination of the profiles) is set to obtain target output values TargetOut (S306). At this time, the target output values TargetOut are obtained that correspond to the to-be-adjusted color space CS6 specified in the to-be-adjusted color space selection section 830. The target output values TargetOut are obtained for adjustment based on the output colors $cmyk_p$ corresponding to the colors of an output image IMO formed on the print substrate ME1.

Figure 18A:
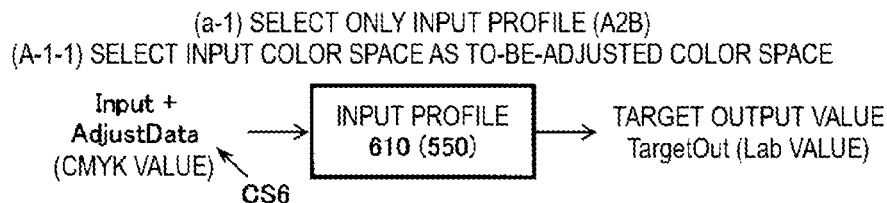
FIGS. 18A to 18D are diagrams schematically illustrating examples of calculation of target output values according to a to-be-adjusted color space.

For example, in a case where only the input profile 610 is specified for color conversion, with the input color space CS4 specified as the to-be-adjusted color space CS6 (a-1-1), adjustment amounts AdjustData are added to the CMYK values (Cp, Mp, Yp, Kp) in the CMYK color space, as illustrated in FIG. 18A. The adjustment amounts AdjustData are represented as relative values (ΔCp, ΔMp, ΔYp, ΔKp). In the CMYK color space, the adjusted CMYK values are represented by (Cp+ΔCp, Mp+ΔMp, Yp+ΔYp, Kp+ΔKp).

In the case of (a-1-1) described above, the target output values TargetOut can be calculated by the following equation (see FIG. 20).

$$\text{TargetOut} = f_{icc}(\text{InputProfile}, A2B, \text{Input} + \text{AdjustData})$$

The host apparatus 100 causes the target module 710 in which the input profile 610 is set to execute a color conversion process. At this time, the host apparatus 100 passes, to the target module 710, the information A2B representing the A2B table 611 and the input values Input+AdjustData (input coordinate values) to cause the target module 710 to execute the color conversion process, and acquires the output values TargetOut (output coordinate values) from the target module 710 as the current output values CurrentOut.

Figure 18B:
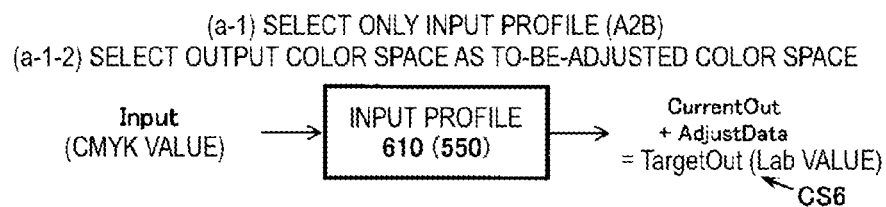

In a case where only the input profile 610 is specified for color conversion, with the input color space CS5 specified as the to-be-adjusted color space CS6 (a-1-2), the adjustment amounts AdjustData are added to the Lab values (Lp, ap, bp) in the Lab color space, as illustrated in FIG. 18B. The adjustment amounts AdjustData are represented as relative values (ΔLp, Δap, Δbp). In the Lab color space, the adjusted Lab values are represented by (Lp+ΔLp, ap+Δap, bp+Δbp).

In the case of (a-1-2) described above, the target output values TargetOut can be calculated by the following equation (see FIG. 20).

$$\text{TargetOut} = f_{icc}(\text{InputProfile}, A2B, \text{Input}) + \text{AdjustData}$$

The host apparatus 100 causes the target module 710 in which the input profile 610 is set to execute a color conversion process. At this time, the host apparatus 100 passes, to the target module 710, the information A2B representing the A2B table 611 and the input values Input (input coordinate values) to cause the target module 710 to execute the color conversion process, and acquires the output coordinate values from the target module 710. Addition of the adjustment amounts AdjustData to the output coordinate values results in the target output values TargetOut.

Figure 18C:
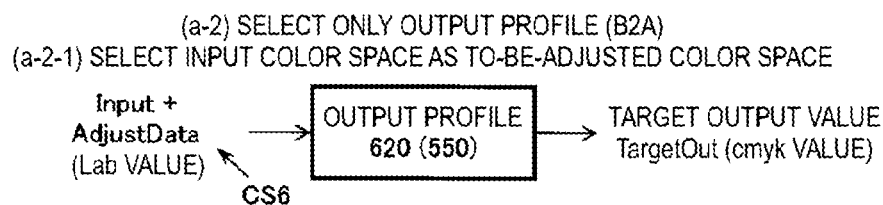

In a case where only the output profile 620 is specified for color conversion, with the input color space CS4 specified as the to-be-adjusted color space CS6 (a-2-1), the adjustment amounts AdjustData are added to the Lab values (Lp, ap, bp) in the Lab color space, as illustrated in FIG. 18C. The adjustment amounts AdjustData are represented as relative values (ΔLp, Δap, Δbp). In the Lab color space, the adjusted Lab values are represented by (Lp+ΔLp, ap+Δap, bp+Δbp).

In the case of (a-2-1) described above, the target output values TargetOut can be calculated by the following equation (see FIG. 20).

$$\text{TargetOut} = f_{icc}(\text{OutputProfile}, B2A, \text{Input} + \text{AdjustData})$$

The host apparatus 100 causes the target module 710 in which the output profile 620 is set to execute a color conversion process. At this time, the host apparatus 100 passes, to the target module 710, the information B2A representing the B2A table 621 and the input values Input+AdjustData (input coordinate values) to cause the target module 710 to execute the color conversion process, and acquires the output values TargetOut (output coordinate values) from the target module 710.

Figure 18D:
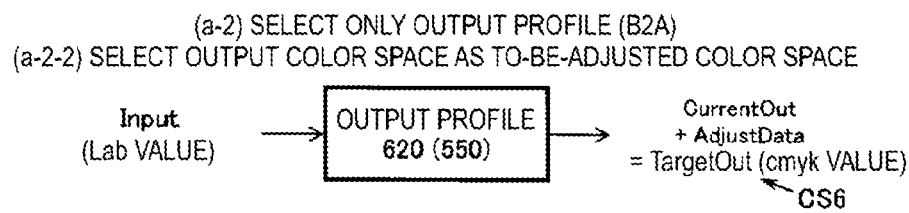

In a case where only the output profile 620 is specified for color conversion, with the output color space CS5 specified in the to-be-adjusted color space CS6 (a-2-2), the adjustment amounts AdjustData are added to the cmyk values (cp, mp, yp, kp) in the cmyk color space, as illustrated in FIG. 18D. The adjustment amounts AdjustData are represented as relative values (Δcp, Δmp, Δyp, Δkp). In the cmyk color space, the adjusted cmyk values are represented by (cp+Δcp, mp+Δmp, yp+Δyp, kp+Δkp).

In the case of (a-2-2) described above, the target output values TargetOut can be calculated by the following equation (see FIG. 20).

$$\text{TargetOut} = f_{icc}(\text{OutputProfile}, B2A, \text{Input}) + \text{AdjustData}$$

The host apparatus 100 causes the target module 710 in which the output profile 620 is set to execute a color conversion process. At this time, the host apparatus 100 passes, to the target module 710, the information B2A representing the B2A table 621 and the input values Input (input coordinate values) to cause the target module 710 to execute the color conversion process, and acquires the output coordinate values from the target module 710. Addition of the adjustment amounts AdjustData to the output coordinate values results in the target output values TargetOut.

In a case where the device link profile 630 is specified for color conversion, with the input color space CS4 specified as the to-be-adjusted color space CS6 (a-3-1), the adjustment amounts AdjustData are added to the CMYK values (Cp, Mp, Yp, Kp) in the CMYK color space. The adjustment amounts AdjustData are represented as relative values (ΔCp, ΔMp, ΔYp, ΔKp). In the CMYK color space, the adjusted CMYK values are represented by (Cp+ΔCp, Mp+ΔMp, Yp+ΔYp, Kp+ΔKp).

In the case of (a-3-1) described above, the target output values TargetOut can be calculated by the following equation (see FIG. 20).

$$\text{TargetOut} = f_{icc}(\text{DLProfile}, A2B0, \text{Input} + \text{AdjustData})$$

The host apparatus 100 causes the target module 710 in which the device link profile 630 is set to execute a color conversion process. At this time, the host apparatus 100 passes, to the target module 710, the information A2B0 representing the device link table 631 and the input values Input+AdjustData (input coordinate values) to cause the target module 710 to execute the color conversion process, and acquires the output values TargetOut (output coordinate values) from the target module 710.

In a case where the device link profile 630 is specified for color conversion, with the output color space CS5 specified as the to-be-adjusted color space CS6 (a-3-2), the adjustment amounts AdjustData are added to the cmyk values (cp, mp, yp, kp) in the cmyk color space. The adjustment amounts AdjustData are represented as relative values ($\Delta$cp, $\Delta$mp, $\Delta$yp, $\Delta$kp). In the cmyk color space, the adjusted cmyk values are represented by (cp+$\Delta$cp, mp+$\Delta$mp, yp+$\Delta$yp, kp+$\Delta$kp).

In the case of (a-3-2) described above, the target output values TargetOut can be calculated by the following equation (see FIG. 20).

$$\text{TargetOut}=f_{icc}(\text{DLProfile},A2B0,\text{Input})+\text{AdjustData}$$

The host apparatus 100 causes the target module 710 in which the device link profile 630 is set to execute a color conversion process. At this time, the host apparatus 100 passes, to the target module 710, the information A2B0 representing the device link table 631 and the input values Input (input coordinate values) to cause the target module 710 to execute the color conversion process, and acquires the output coordinate values from the target module 710. Addition of the adjustment amounts AdjustData to the output coordinate values results in the target output values TargetOut.

In a case where the combination of the profiles 610 and 620 is specified for color conversion, with the input color space CS4 of the input profile 610 specified as the to-be-adjusted color space CS6 (b-1-1), the adjustment amounts AdjustData are added to the CMYK values (Cp, Mp, Yp, Kp) in the CMYK color space, as illustrated in FIG. 19A. The adjustment amounts AdjustData are represented as relative values ($\Delta$Cp, $\Delta$Mp, $\Delta$Yp, $\Delta$Kp). In the CMYK color space, the adjusted CMYK values are represented by (Cp+$\Delta$Cp, Mp+$\Delta$Mp, Yp+$\Delta$Yp, Kp+$\Delta$Kp).

In the case of (b-1-1) described above, different processes are executed depending on whether the conversion path set in the target module 710 involves the "sequential conversion" or the "direct conversion".

With the "sequential conversion" set, the target module 710 performs a color conversion referring to both profiles 610 and 620. In this case, the target output values TargetOut can be calculated by the following equation (see FIG. 20).

$$\text{TargetOut}=f_{icc}(\text{OutputProfile},B2A,f_{icc}(\text{InputProfile},A2B,\text{Input}+\text{AdjustData}))$$

The same equation is used even in a case where the to-be-adjusted profile 550 is the output profile 620.

The target module 710 first refers to the A2B table 611 of the input profile 610 to cause the host apparatus 100 to implement a function to convert the input values Cp+$\Delta$Cp, Mp+$\Delta$Mp, Yp+$\Delta$Yp, Kp+$\Delta$Kp into Lab values in accordance with the set interpolation method. The target module 710 then refers to the B2A table 621 of the output profile 620 to cause the host apparatus 100 to implement a function to convert the Lab values into output values in accordance with the set interpolation method. The target module 710 returns the output values as a calculation result. The host apparatus 100 acquires the output values as the target output values TargetOut. This allows for a color conversion process achieving accurate color reproduction.

With the "direct conversion" set, the target module 710 refers to the device link table 631 to cause the host apparatus 100 to implement a function to convert the input values Cp+$\Delta$Cp, Mp+$\Delta$Mp, Yp+$\Delta$Yp, Kp+$\Delta$Kp into output values in accordance with the set interpolation method. The target module 710 returns the output values as a calculation result. The host apparatus 100 acquires the output values as the target output values TargetOut. This allows for a quick color conversion process.

In a case where the combination of the profiles 610 and 620 is specified for color conversion, with the output color space CS5 of the output profile 620 specified as the to-be-adjusted color space CS6 (b-1-2), the adjustment amounts AdjustData are added to the cmyk values (cp, mp, yp, kp) in the cmyk color space, as illustrated in FIG. 19B. The adjustment amounts AdjustData are represented as relative values ($\Delta$cp, $\Delta$mp, $\Delta$yp, $\Delta$kp). In the cmyk color space, the adjusted cmyk values are represented by (cp+$\gamma$cp, mp+$\Delta$mp, yp+$\Delta$yp, kp+$\Delta$kp).

In the case of (b-1-2) described above, different processes are executed depending on whether the conversion path set in the target module 710 involves the "sequential conversion" or the "direct conversion".

With the "sequential conversion" set, the target output values TargetOut can be calculated by the following equation (see FIG. 20).

$$\text{TargetOut}=f_{icc}(\text{OutputProfile},B2A,f_{icc}(\text{InputProfile},A2B,\text{Input}))+\text{AdjustData}$$

The same equation is used even if the to-be-adjusted profile 550 is the output profile 620.

The target module 710 first refers to the A2B table 611 of the input profile 610 to cause the host apparatus 100 to implement a function to convert the input values Input into Lab values in accordance with the set interpolation method. The target module 710 then refers to the B2A table 621 of the output profile 620 to cause the host apparatus 100 to implement a function to convert the Lab values into output values in accordance with the set interpolation method. The target module 710 returns the output values as a calculation result. The host apparatus 100 adds the adjustment amounts AdjustData to the output values to acquire the target output values TargetOut.

With the "direct conversion" set, the target module 710 refers to the device link table 631 to cause the host apparatus 100 to implement a function to convert the input values Input into output values in accordance with the set interpolation method. The target module 710 returns the output values as a calculation result. The host apparatus 100 adds the adjustment amounts AdjustData to the output values to acquire the target output values TargetOut.

In a case where the combination of the profiles 610 and 620 is specified for color conversion, with the PCS as the to-be-adjusted color space CS6 (the output color space CS5 in the input color space 610 and the input color space CS4 in the output profile 620) (b-1-3), the adjustment amounts AdjustData are added to the Lab values (Lp, ap, bp) in the Lab color space, as illustrated in FIG. 19C. The adjustment amounts AdjustData are represented as relative values ($\Delta$Lp, $\Delta$ap, $\Delta$bp). In the Lab color space, the adjusted Lab values are represented by (Lp+$\Delta$Lp, ap+$\Delta$ap, bp+$\Delta$bp).

In the case of (b-1-3) described above, the color conversion process referring to the input profile 610 and the color conversion process referring to the output profile 620 are sequentially executed.

$$\text{TargetOut}=f_{icc}(\text{OutputProfile},B2A,f_{icc}(\text{InputProfile},A2B,\text{Input})+\text{AdjustData})$$

The same equation is used even in a case where the to-be-adjusted profile 550 is the output profile 620.

The target module 710 first refers to the A2B table 611 of the input profile 610 to cause the host apparatus 100 to implement a function to convert the input values Input into the Lab values Lp, ap, bp in accordance with the set interpolation method. The target module 710 returns the output values Lp, ap, bp as a calculation result. The host apparatus 100 adds the adjustment amounts AdjustData to the output values La, ap, bp to acquire the adjusted Lab values Lp+ΔLp, ap+Δap, bp+Δbp, and passes the adjusted Lab values to the target module 710. The target module 710 then refers to the B2A table 621 of the output profile 620 to cause the host apparatus 100 to implement a function to convert the Lab values Lp+ΔLp, ap+Δap, bp+Δbp into output values in accordance with the set interpolation method. The target module 710 returns the output values as a calculation result. The host apparatus 100 acquires the output values as the target output values TargetOut.

In a case where all of the profiles 610, 620, and 630 are selected, the target output values TargetOut are acquired as in the cases (b-1-1), (b-1-2), and (b-1-3) where the combination of the profiles 610 and 620 is specified for color conversion.

Note that the calculation of the target output values TargetOut may be omitted in a case where the adjustment target T0 is represented by the output coordinate values, and may be limited to a case where the adjustment target T0 is not represented by the output coordinate values.

After calculating the target output values TargetOut, the host apparatus 100 acquires, for each adjustment point P0, input values Input_P and adjustment target values TargetOut_P in the to-be-adjusted profile 550 (S308). This is to adjust the correspondence relationship between the input values and the output values in the to-be-adjusted profile 550.

In the cases of (a-1), (a-2), and (a-3) illustrated in FIG. 16A, FIG. 16B, and FIG. 16C, the input values Input in the specified profile are used as the input value Input_P in the to-be-adjusted profile 550, and the target output values TargetOut in the specified profile are used as the adjustment target values TargetOut_P in the to-be-adjusted profile 550. This is expressed by the following equations (see FIG. 22).

$$\text{Input\_}P = \text{Input}$$

$$\text{TargetOut\_}P = \text{TargetOut}$$

Furthermore, current output values CurrentOut_P in the to-be-adjusted profile 550 are current output values CurrentOut in the specified profile.

$$\text{CurrentOut\_}P = \text{CurrentOut}$$

In the output color space CS5 of the to-be-adjusted profile 550, relative values of the adjustment target T0 are represented by TargetOut_P−CurrentOut_P.

Figure 21A:
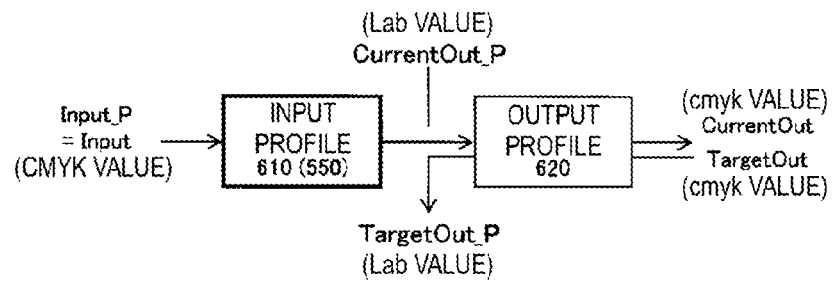
FIG. 21A and FIG. 21B are diagrams schematically illustrating examples of determination of input values and adjustment target values for the to-be-adjusted profile.

As illustrated in FIG. 21A, in the case of (b-1) illustrated in FIG. 16D, i.e., in a case where the combination of the profiles 610 and 620 is selected for color conversion, with the input profile 610 specified as the to-be-adjusted profile 550, then the combination of the input values Input in the profiles 610 and 620 are used as the input values Input_P in the to-be-adjusted profile 550. The adjustment target values TargetOut_P (Lab values) in the to-be-adjusted profile 550 may be calculated from the target output values TargetOut, which are cmyk values (see FIG. 22).

$$\text{Input\_}P = \text{Input}$$

$$\text{TargetOut\_}P = f_{icc}(\text{OutputProfile}, A2B, \text{TargetOut})$$

The adjustment target values TargetOut_P (Lab values) in the to-be-adjusted profile 550 are determined from the target output values TargetOut (cmyk values) to allow for adjustment based on the output color $\text{cmyk}_p$ corresponding to the color of the output image IMO.

The host apparatus 100 passes, to the target module 710, the information OutputProfile representing the output profile 620, the information A2B representing the A2B table of the output profile 620, and the target output values TargetOut as the input coordinate values to cause the target module 710 to execute the color conversion process, and acquires the adjustment target values TargetOut_P from the target module 710.

Furthermore, current output values CurrentOut_P (Lab values) in the to-be-adjusted profile 550 are represented by the following equation.

$$\text{CurrentOut\_}P = f_{icc}(\text{InputProfile}, A2B, \text{Input})$$

In the output color space CS5 of the to-be-adjusted profile 550, the relative values of the adjustment target T0 are represented by TargetOut_P−CurrentOut_P.

Figure 21B:
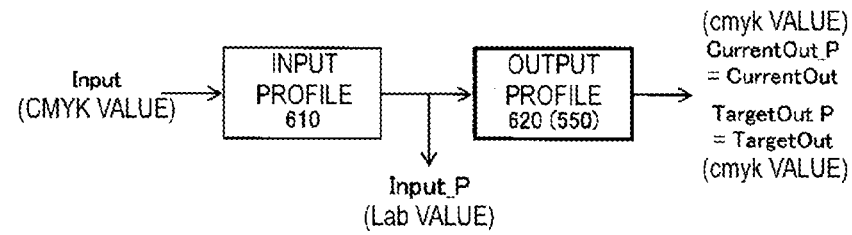

As illustrated in FIG. 21B, in the case of (b-2) illustrated in FIG. 16E, i.e., in a case where the combination of the profiles 610 and 620 is selected for color conversion, with the output profile 620 specified as the to-be-adjusted profile 550, then the target output values TargetOut in the combination of the profiles 610 and 620 are used as the adjustment target values TargetOut_P in the to-be-adjusted profile 550. The input values Input_P (Lab values) in the to-be-adjusted profile 550 may be calculated from the input values Input, which are CMYK values (see FIG. 22).

$$\text{Input\_}P = f_{icc}(\text{InputProfile}, A2B, \text{Input})$$

$$\text{TargetOut\_}P = \text{TargetOut}$$

The host apparatus 100 passes, to the target module 710, the information InputProfile representing the input profile 610, the information A2B representing the A2B table 611, and the input values Input (input coordinate values) to cause the target module 710 to execute the color conversion process, and acquires the input values Input_P in the to-be-adjusted profile 550 from the target module 710.

Furthermore, the current output values CurrentOut_P (cmyk values) in the to-be-adjusted profile 550 are the current output values CurrentOut in the combination of the profiles 610 and 620.

$$\text{CurrentOut\_}P = \text{CurrentOut}$$

In the output color space CS5 of the to-be-adjusted profile 550, the relative values of the adjustment target T0 are represented by TargetOut_P−CurrentOut_P.

After acquiring the input values Input_P and the adjustment target values TargetOut_P in the to-be-adjusted profile 550, the host apparatus 100 adjusts, in S310 to S312, the adjustment range A0 of the to-be-adjusted profile 550, based on the adjustment target T0.

First, with reference to FIG. 23A and FIG. 23B, a concept in which the to-be-adjusted profile 550 is adjusted in the adjustment range A0 will be described. Here, in FIG. 23A and FIG. 23B, the horizontal axis indicates input values along a certain coordinate axis of the input color space CS4, and the vertical axis indicates output values along a certain coordinate axis of the output color space CS5. For example, in a case where the input color space CS4 is the CMYK color space, the horizontal axis corresponds to the C axis, the M axis, the Y axis, or the K axis. In a case where the output color space CS5 is the Lab color space, the vertical axis corresponds to the L axis, the a axis, or the b axis. White circles on the horizontal axis indicate grid points GD0.

Figure 23A:
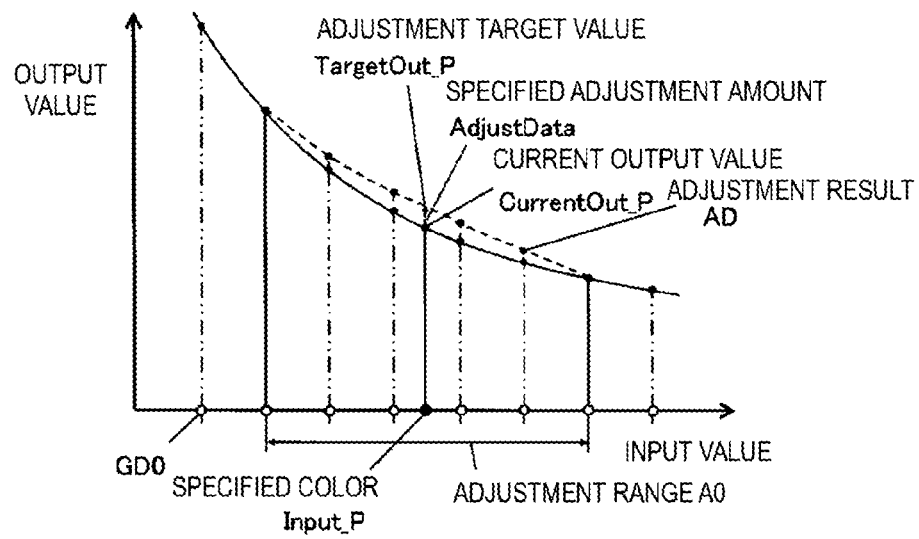
FIG. 23A is a diagram schematically illustrating adjustment amounts for each grid point in a case where a to-be-adjusted profile is adjusted in an output color space for the to-be-adjusted profile.

FIG. 23A schematically illustrates the adjustment amounts AD for each grid point GD0 in a case where the output values are adjusted. The adjustment point P0 specified by the user corresponds to the input values Input_P. When the user gives an instruction for the adjustment amounts AdjustData as the adjustment target T0, the adjustment amounts AdjustData are added to the current output values CurrentOut_P corresponding to the input values Input_P to set the adjustment target values TargetOut_P. Of course, in a case where the to-be-adjusted color space CS6 is the cmyk color space, the current output values CurrentOut_P and the adjustment target values TargetOut_P are represented by cmyk values, and the adjustment amounts AdjustData are represented by the relative values of the cmyk values ($\Delta$cp, $\Delta$mp, $\Delta$yp, $\Delta$kp). In a case where the to-be-adjusted color space CS6 is the Lab color space, the current output values CurrentOut_P and the adjustment target values TargetOut_P are represented by Lab values, and the adjustment amounts AdjustData are represented by the relative values of the Lab values ($\Delta$Lp, $\Delta$ap, $\Delta$bp).

An input to the adjustment range specification section 850 and the target acceptance area 840 illustrated in FIG. 14 sets the adjustment range A0 for the adjustment amounts AdjustData. Basically, the adjustment amounts for the output values are maximized with respect to the input values Input_P, and the adjustment amounts are set to 0 at boundaries of the adjustment range A0. However, actual adjustment is performed on the grid points GD0 in the to-be-adjusted profile 550, and thus, the adjustment may affect a range wider than the set adjustment range A0.

Figure 23B:
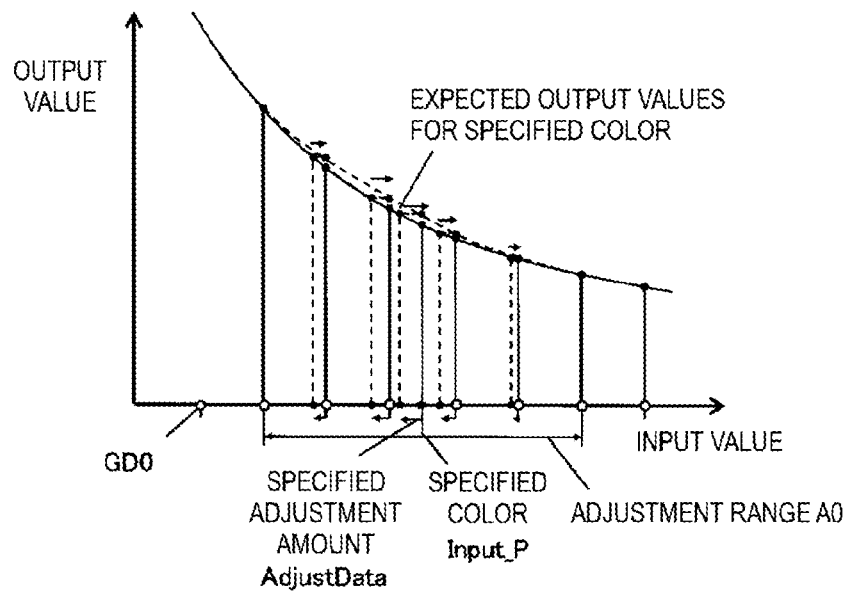
FIG. 23B is a diagram schematically illustrating the adjustment amounts for each grid point in a case where the to-be-adjusted profile is adjusted in an input color space for the to-be-adjusted profile.

FIG. 23B schematically illustrates the adjustment amounts AD for each grid point GD0 in a case where the input values are adjusted. The adjustment point P0 specified by the user corresponds to the input values Input_P. When the user gives an instruction for the adjustment amounts AdjustData as the adjustment target T0, the adjustment amounts AdjustData are added to the input value Input_P to determine output values corresponding to the input values Input_P+AdjustData. The output values are output values expected at the adjustment point P0 specified by the user. Of course, in a case where the to-be-adjusted color space CS6 is the CMYK color space, the input values Input_P are represented by CMYK values, and the adjustment amounts AdjustData are represented by the relative values of the CMYK values ($\Delta$Cp, $\Delta$Mp, $\Delta$Yp, $\Delta$Kp). In a case where the to-be-adjusted color space CS6 is the Lab color space, the input values Input_P are represented by Lab values, and the adjustment amounts AdjustData are represented by the relative values of the Lab values ($\Delta$Lp, $\Delta$ap, $\Delta$bp).

The above-described correction is performed for all the coordinate axes in the input color space CS4 and for all the coordinate values in the output color space CS5.

Now, with reference to FIG. 24A and FIG. 24B, an example will be described where the adjustment amounts AD is set for each grid point GD0 within the adjustment range A0. Here, in FIG. 24A and FIG. 24B, the horizontal axis indicates each input value, and the vertical axis indicates the adjustment amount AD for each output value. Furthermore, triangular marks on the horizontal axis indicate the grid points within the adjustment range A0 (excluding a nearest grid point GDnearest), and square marks on the horizontal axis indicate grid points outside the adjustment range A0 for which the output value is not to be modified.

Figure 24A:
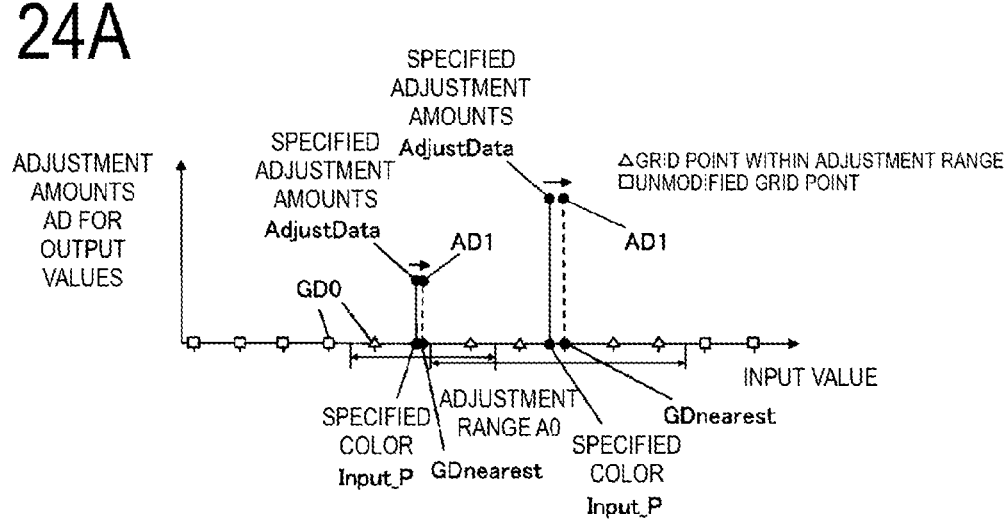
FIG. 24A is a diagram schematically illustrating an example where the adjustment amounts for output values of the nearest grid point are determined.

First, as illustrated in FIG. 24A, the host apparatus 100 determines, for each adjustment point P0, an adjustment amount AD1 for the output value for the nearest grid point GDnearest, which is closest to the adjustment point P0 (S310 in FIG. 13). FIG. 24A illustrates an example where the adjustment amount AD1 for the output value is determined in a case where two adjustment points P0 (input values Input_P) are specified on a certain coordinate axis of the input color space CS4. In the example in FIG. 24A, the adjustment amounts AdjustData for the input values Input_P are used as the adjustment amount AD1 for the output value for the nearest grid point GDnearest without any change. Of course, the technique is not limited to setting, to the adjustment amount AdjustData, the adjustment amount AD1 for the output value for the nearest grid point GDnearest.

Note that a plurality of adjustment points lying near one another may have the same nearest grid point GDnearest. In this case, for example, in the input color space CS4, the adjustment amounts AdjustData for the adjustment points may be averaged at a rate inversely proportional to a distance from the nearest grid point GDnearest to the adjustment point.

Figure 24B:
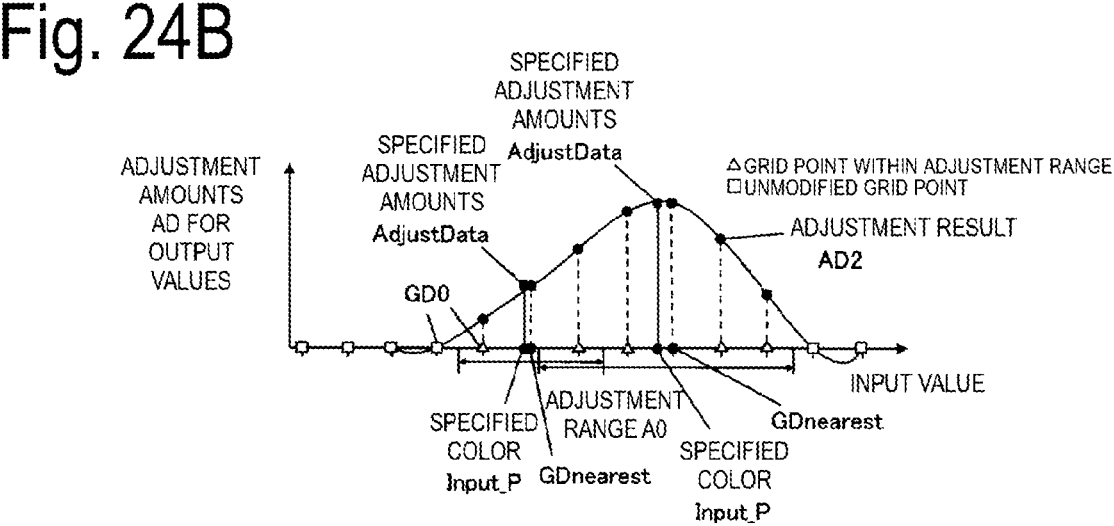
FIG. 24B is a diagram schematically illustrating an example where the adjustment amounts for output values of grid points around the nearest grid point are determined.

After determination of the adjustment amount AD1 for the output value for the nearest grid point GDnearest, the host apparatus 100 determines adjustment amounts AD2 for the output values for grid points (the grid points with the triangular marks) lying within the adjustment range A0 and around the nearest grid point GDnearest (S312 in FIG. 13), as illustrated in FIG. 24B. For example, with the adjustment amounts for the output values for the grid points outside the adjustment range A0 set to 0 and with the adjustment amount AD1 for the output value for each nearest grid point GDnearest described above set to AdjustData, an interpolation calculation is executed using a three- or four-dimensional cubic spline function. Then, the adjustment amounts AD2 for the output values for the grid points around the nearest grid point GDnearest can be determined. Here, in a case where the input color space CS4 is the CMYK color space, the interpolation calculation may use the four-dimensional cubic spline function. In a case where the input color space CS4 is the Lab color space, the interpolation calculation may use the three-dimensional cubic spline function. Such an interpolation calculation smoothly connects the adjustment amounts AD2 for the output values for the grid points around the nearest grid point GDnearest to the adjustment amount AD1 for the output value for each nearest grid point GDnearest and to the adjustment amount "0" for the output values for the grid points outside the adjustment range A0.

Of course, the technique is not limited to the use of the spline function for the interpolation calculation.

Note that, since the adjustment amounts AD are intended for the grid points, in a case where a plurality of adjustment points lies near one another, the same grid point may be referred to when input colors for the adjustment points are color-converted in accordance with the input profile 610. For such a grid point, the adjustment amounts AdjustData for the adjustment points are averaged for adjustment.

After the determination of the adjustment amounts AD for the output values for each grid point within the adjustment range A0, the host apparatus 100 revises the to-be-adjusted profile 550 by using the determined adjustment amounts AD (S314 in FIG. 13). That is, for each grid point within the adjustment range A0, a value obtained by adding the adjustment amount AD to the current output value may be written to the to-be-adjusted profile 550 as an updated output value. For example, in a case where the output color space CS5 of the to-be-adjusted profile 550 is the cmyk color space, the updated output values are obtained by adding the adjustment amounts (denoted as Δcq, Δmq, Δyq, Δkq) to the current output values (denoted as cq, mq, yq, kq). The output color space CS5 in the to-be-adjusted profile 550 is the Lab color space, and thus, the updated output values are values (Lq+ΔLq, aq+Δaq, bq+Δbq) resulting from the sum of the current output values (denoted as Lq, aq, bq) and the adjustment amounts (denoted as ΔLq, Δaq, Δbq). In this case, the variable q is a variable that identifies each grid point within the adjustment range A0.

As described above, the correspondence relationship for the to-be-adjusted profile 550 is adjusted to make the current output values CurrentOut in the second color space CS2 closer to the target output values TargetOut color.

After updating the to-be-adjusted profile 550, the host apparatus 100 determines, for each adjustment point P0 input to the target acceptance area 840, the current output values CurrentOut by using the updated to-be-adjusted profile 550 or the combination of the profiles including the updated to-be-adjusted profile 550 (S316). The updated current output values CurrentOut can be calculated using the same equation as that for the process in S304 described with reference to FIGS. 16A to 16E and FIG. 15. The host apparatus 100 invokes and causes the target module 710 to execute a color conversion process, and acquires the current output values CurrentOut from the target module 710.

Furthermore, the host apparatus 100 determines, for each adjustment point P0 input to the target acceptance area 840, a difference d between the set of updated current output values CurrentOut and the set of target output values TargetOut (S318). The difference is, e.g., a Euclidean distance between a point corresponding to the set of output values CurrentOut in the output color space CS5 of the to-be-adjusted profile 550 and a point corresponding to the set of target output values TargetOut.

Then, the host apparatus 100 determines whether an end condition for the repeated processes in S308 to S320 has been met (S320), and in a case where the end condition has not been met, repeats the processes in S308 to S320. In a case where the end condition has been met, the host apparatus 100 causes the storage device 114 to store the adjusted to-be-adjusted profile 550, and ends the profile adjustment process. For example, the end condition is met in a case where the difference d is smaller than or equal to a prescribed threshold for all the adjustment points P0. Alternatively, the end condition may be met in a case where a specified number of repetitions have been performed.

As described above, the to-be-adjusted profile 550 is adjusted such that the current output values CurrentOut obtained from the input coordinate values corresponding to the adjustment point P0, in accordance with the current to-be-adjusted profile 550 or the combination of the profiles including the to-be-adjusted profile 550, are closer to the target output values TargetOut. In this case, the color conversion module used can be set to be compatible with the RIP, thus allowing the profiles to be adjusted in a usage environment similar to that for the RIP. Moreover, the intended profile is obtained. Furthermore, even in a case where the color conversion module used for the RIP fails to be used for color conversion during profile adjustment, the color conversion characteristics can be made closer to the color conversion characteristics of the RIP by adjusting the interpolation method, the conversion path, or the number of grid points. The profiles can thus be adjusted in a usage environment similar to that for the color conversion module used for the RIP. This specific example therefore enables, during the use of adjusted profiles, intended color conversion results to be further obtained.

6. MODIFIED EXAMPLES

Within the scope of the invention, various modified examples are conceivable.

For example, the output device is not limited to the ink jet-type printer but may be an electrophotographic printer such as a laser printer which uses toner as a color material, a three-dimensional printer, a display apparatus, or the like. The types of color materials forming images are not limited to C, M, Y, and K but may include not only C, M, Y, and K but also dark yellow (DY), orange (Or), and green (Gr) that are higher in density than LC, Lm, and Y, light black (Lk) that is lower in density than K, a non-tinted color material for image quality improvement, and the like.

Of course, the second color space is not limited to the cmyk color space but may be a CMY color space, an RGB color space, or the like.

The target device is not limited to the target printing machine but may be a display apparatus or the like.

Of course, the first color space is not limited to the CMYK color space but may be a CMY color space, an RGB color space, or the like.

In the above-described Exemplary Embodiment, the number of grid points may be changed when the device link profile is generated from the input profile and the output profile. However, the number of grid points in the input profile or the output profile for color conversion may be reduced during profile adjustment. For example, in a case where 33 grid points are provided in each axis direction in the input profile 610 for color conversion, 16 of the 33 grid points may be culled to generate an input profile with 17 grid points in each axis direction. The input profile may be used for the color conversion process. Some of the grid points in the output profile 620 may also be culled, and the resultant output profile 620 may be used for the color conversion process.

The color conversion process can thus be quickly achieved.

7. CONCLUSION

As described above, the aspects of the invention can provide, e.g., a technique that enables, during the use of adjusted profiles, intended color conversion results to be further obtained. Of course, even a technique including only the components recited in the independent claims produces the above-described basic advantages.

Furthermore, the aspects of the invention can implement configurations resulting from mutual replacement of components disclosed in the above-described examples or a change in the combination of the components, configurations resulting from mutual replacement of components disclosed in the known art and the above-described examples or a change in the combination of the components, and the like. The aspects of the invention include these configurations and the like.

This application claims priority under 35 U.S.C. § 119 to Japanese Patent Application No. 2017-233694, filed Dec. 5, 2017. The entire disclosure of Japanese Patent Application No. 2017-233694 is hereby incorporated herein by reference.

What is claimed is:

1. A profile adjustment method for causing a computer to execute a process of adjusting a to-be-adjusted profile by using a color conversion module performing a color conversion process of converting coordinate values in a color space with reference to a profile, the profile adjustment method comprising:

setting a color conversion module included in one or more of the color conversion module, as a target module that is a color conversion module to be used;

causing the target module to execute the color conversion process of converting input coordinate values in an input color space into output coordinate values in an output color space; and executing a process of using a conversion result by the target module to adjust the to-be-adjusted profile, wherein the profile includes an input profile representing a correspondence relationship between first coordinate values in a first device dependent color space and device independent coordinate values in a profile connection space, an output profile representing a correspondence relationship between the device independent coordinate values and second coordinate values in a second device dependent color space, and a device link profile representing a correspondence relationship between the first coordinate values and the second coordinate values, the setting the color conversion module includes accepting a first conversion setting involving passage through the profile connection space or a second conversion setting avoiding the passage through the profile connection space when converting the input coordinate values in the first device dependent color space into the output coordinate values in the second device dependent color space, and the causing the target module to execute the color conversion process includes, in a case where the first conversion setting is accepted, referring to the input profile and the output profile to cause the target module to execute the color conversion process of converting the input coordinate values in the first device dependent color space into the output coordinate values in the second device dependent color space, and in a case where the second conversion setting is accepted, referencing the device link profile to cause the target module to execute the color conversion process of converting the input coordinate values in the first device dependent color space into the output coordinate values in the second device dependent color space.

2. The profile adjustment method according to claim 1, wherein the setting the color conversion module includes causing a display apparatus to display a list of the one or more color conversion modules stored in a storage area and accepting an operation of determining one of the color conversion modules in the list to be the target module, and accepting a setting for a target interpolation method that is an interpolation method to be used which is included in possible interpolation methods for obtaining the output coordinate values when the target module executes the color conversion process, and the causing the target module to execute the color conversion process includes obtaining the output coordinate values corresponding to the input coordinate values in accordance with the target interpolation method.

3. The profile adjustment method according to claim 1, wherein the setting the color conversion module includes determining one of the one or more color conversion modules stored in a storage area to be the target module, based on the to-be-adjusted profile, and accepting a setting for a target interpolation method that is an interpolation method to be used which is included in possible interpolation methods for obtaining the output coordinate values when the target module executes the color conversion process, and the causing the target module to execute the color conversion process includes obtaining the output coordinate values corresponding to the input coordinate values in accordance with the target interpolation method.

4. The profile adjustment method according to claim 1, wherein the setting the color conversion module includes causing a display apparatus to display a list of the one or more color conversion modules stored in a storage area and accepting an operation of determining one of the color conversion modules in the list to be the target module, and accepting a setting for a target interpolation method that is an interpolation method to be used which is included in possible interpolation methods for obtaining the output coordinate values when the target module executes the color conversion process, the causing the target module to execute the color conversion process includes obtaining the output coordinate values corresponding to the input coordinate values in accordance with the target interpolation method, and the interpolation method is an n-point interpolation method of interpolating the output coordinate values, based on coordinate values in the output color space for n (n is an integer of 4 or larger) grid points in the profile.

5. The profile adjustment method according to claim 1, wherein the setting the color conversion module includes determining one of the one or more color conversion modules stored in a storage area to be the target module, based on the to-be-adjusted profile, and accepting a setting for a target interpolation method that is an interpolation method to be used which is included in possible interpolation methods for obtaining the output coordinate values when the target module executes the color conversion process, the causing the target module to execute the color conversion process includes obtaining the output coordinate values corresponding to the input coordinate values in accordance with the target interpolation method, and the interpolation method is an n-point interpolation method of interpolating the output coordinate values, based on coordinate values in the output color space for n (n is an integer of 4 or larger) grid points in the profile.

6. The profile adjustment method according to claim 1, wherein the setting the color conversion module includes causing a display apparatus to display a list of the one or more color conversion modules stored in a storage area and accepting an operation of determining one of the color conversion modules in the list to be the target module.

7. The profile adjustment method according to claim 1, wherein the setting the color conversion module includes determining one of the one or more color conversion modules stored in a storage area to be the target module, based on the to-be-adjusted profile.

8. The profile adjustment method according to claim 1, wherein
the setting the color conversion module includes accepting a setting for a target interpolation method that is an interpolation method to be used which is included in possible interpolation methods for obtaining the output coordinate values when the target module executes the color conversion process,
the causing the target module to execute the color conversion process includes obtaining the output coordinate values corresponding to the input coordinate values in accordance with the target interpolation method.

9. The profile adjustment method according to claim 1, wherein
the setting the color conversion module includes accepting a setting for a target interpolation method that is an interpolation method to be used which is included in possible interpolation methods for obtaining the output coordinate values when the target module executes the color conversion process,
the causing the target module to execute the color conversion process includes obtaining the output coordinate values corresponding to the input coordinate values in accordance with the target interpolation method,
the interpolation method is an n-point interpolation method of interpolating the output coordinate values, based on coordinate values in the output color space for n (n is an integer of 4 or larger) grid points in the profile.

10. The profile adjustment method according to claim 1, wherein
the setting the color conversion module includes accepting a setting for a number of grid points in the profile, and
the causing the target module to execute the color conversion process includes referring to the profile including a plurality of grid points corresponding to the number of grid points and causing the target module to execute the color conversion process.

11. The profile adjustment method according to claim 1, wherein
the setting the color conversion module includes causing a display apparatus to display a list of the one or more color conversion modules stored in a storage area and accepting an operation of determining one of the color conversion modules in the list to be the target module, and
accepting a setting for a number of grid points in the profile, and
the causing the target module to execute the color conversion process includes referring to the profile including a plurality of grid points corresponding to the number of grid points and causing the target module to execute the color conversion process.

12. The profile adjustment method according to claim 1, wherein
the setting the color conversion module includes determining one of the one or more color conversion modules stored in a storage area to be the target module, based on the to-be-adjusted profile, and
accepting a setting for a number of grid points in the profile, and
the causing the target module to execute the color conversion process includes referring to the profile including a plurality of grid points corresponding to the number of grid points and causing the target module to execute the color conversion process.

13. The profile adjustment method according to claim 1, wherein
the setting the color conversion module includes accepting a setting for a target interpolation method that is an interpolation method to be used which is included in possible interpolation methods for obtaining the output coordinate values when the target module executes the color conversion process,
the causing the target module to execute the color conversion process includes obtaining the output coordinate values corresponding to the input coordinate values in accordance with the target interpolation method, and
accepting a setting for a number of grid points in the profile, and
the causing the target module to execute the color conversion process includes referring to the profile including a plurality of grid points corresponding to the number of grid points and causing the target module to execute the color conversion process.

14. A profile adjustment apparatus for executing a process of adjusting a to-be-adjusted profile by using a color conversion module performing a color conversion process of converting coordinate values in a color space with reference to a profile, the profile adjustment apparatus comprising:
a processor configured to set a color conversion module included in one or more of the color conversion module, as a target module that is a color conversion module to be used,
the processor being configured to cause the target module to execute the color conversion process of converting input coordinate values in an input color space into output coordinate values in an output color space, and
the processor being configured to execute a process of using a conversion result by the target module to adjust the to-be-adjusted profile,
wherein the profile includes an input profile representing a correspondence relationship between first coordinate values in a first device dependent color space and device independent coordinate values in a profile connection space, an output profile representing a correspondence relationship between the device independent coordinate values and second coordinate values in a second device dependent color space, and a device link profile representing a correspondence relationship between the first coordinate values and the second coordinate values,
the setting the color conversion module by the processor includes accepting a first conversion setting involving passage through the profile connection space or a second conversion setting avoiding the passage through the profile connection space when converting the input coordinate values in the first device dependent color space into the output coordinate values in the second device dependent color space, and
the causing the target module to execute the color conversion process by the processor includes,
in a case where the first conversion setting is accepted, referring to the input profile and the output profile to cause the target module to execute the color conversion process of converting the input coordinate values in the first device dependent color space into the output coordinate values in the second device dependent color space, and in a case where the second conversion setting is accepted, referencing the device link profile to cause the target module to execute the color conversion process of converting the input coordinate values in the first device dependent color space into the output coordinate values in the second device dependent color space.

15. A profile adjustment system for executing a process of adjusting a to-be-adjusted profile by using a color conversion module performing a color conversion process of converting coordinate values in a color space with reference to a profile, the profile adjustment system comprising:
   a printing apparatus configured to print a color chart including a patch;
   a colorimetric apparatus configured to execute a colorimetric process on the patch; and
   a processor configured to set a color conversion module included in one or more of the color conversion module, as a target module that is a color conversion module to be used,
   the processor being configured to cause the target module to execute the color conversion process of converting input coordinate values in an input color space into output coordinate values in an output color space, and
   the processor being configured to execute a process of using a conversion result produced by the target module to adjust the to-be-adjusted profile,
   wherein the profile includes an input profile representing a correspondence relationship between first coordinate values in a first device dependent color space and device independent coordinate values in a profile connection space, an output profile representing a correspondence relationship between the device independent coordinate values and second coordinate values in a second device dependent color space, and a device link profile representing a correspondence relationship between the first coordinate values and the second coordinate values,
   the setting the color conversion module by the processor includes accepting a first conversion setting involving passage through the profile connection space or a second conversion setting avoiding the passage through the profile connection space when converting the input coordinate values in the first device dependent color space into the output coordinate values in the second device dependent color space, and
   the causing the target module to execute the color conversion process by the processor includes,
   in a case where the first conversion setting is accepted, referring to the input profile and the output profile to cause the target module to execute the color conversion process of converting the input coordinate values in the first device dependent color space into the output coordinate values in the second device dependent color space, and
   in a case where the second conversion setting is accepted, referencing the device link profile to cause the target module to execute the color conversion process of converting the input coordinate values in the first device dependent color space into the output coordinate values in the second device dependent color space.

* * * * *